(12) United States Patent
Tzovaras et al.

(10) Patent No.: US 10,878,504 B2
(45) Date of Patent: Dec. 29, 2020

(54) MICRO-FINANCING PLATFORM FOR POOLED INVESTING BASED ON PURCHASE OF GAME OF CHANCE TICKETS OR TOKENS OF KNOWN FACE VALUE

(71) Applicant: Pragma-IoT IKE, Thermi-Thessaloniki (GR)

(72) Inventors: Dimitrios Tzovaras, Salonika (GR); Dimosthenis Ioannidis, Raidestos (GR); Stelios Krinidis, Thermi (GR); Lambros Makris, Thermi-Thessaloniki (GR); Konstantinos Kitsikoudis, Sykies-Thessaloniki (GR)

(73) Assignee: PRAGMA-IOT IKE, Thermi-Thessaloniki (GR)

( * ) Notice: Subject to any disclaimer, the term of this patent is extended or adjusted under 35 U.S.C. 154(b) by 0 days.

(21) Appl. No.: 16/930,081

(22) Filed: Jul. 15, 2020

(65) Prior Publication Data
US 2020/0349650 A1 Nov. 5, 2020

Related U.S. Application Data

(63) Continuation-in-part of application No. 15/846,848, filed on Dec. 19, 2017.

(60) Provisional application No. 62/436,979, filed on Dec. 20, 2016.

(51) Int. Cl.
*G06Q 40/06* (2012.01)
*G06Q 20/32* (2012.01)
*G07F 17/32* (2006.01)

(52) U.S. Cl.
CPC ........ *G06Q 40/06* (2013.01); *G06Q 20/3278* (2013.01); *G07F 17/329* (2013.01); *G07F 17/3288* (2013.01)

(58) Field of Classification Search
CPC ............................ G06Q 40/06; G06Q 20/3287
USPC ......................................................... 705/36 R
See application file for complete search history.

(56) References Cited

U.S. PATENT DOCUMENTS

| | | | | |
|---|---|---|---|---|
| 2002/0165811 A1* | 11/2002 | Ishii | .................. | G06Q 40/04 705/36 R |
| 2014/0012780 A1* | 1/2014 | Sanders | ............. | G06Q 30/0213 705/36 R |
| 2015/0371333 A1* | 12/2015 | Seif | ................... | G06O 40/06 705/36 R |

* cited by examiner

*Primary Examiner* — Robert R Niquette
*Assistant Examiner* — Liz P Nguyen
(74) *Attorney, Agent, or Firm* — Franco De Liguori; DP IP Group

(57) ABSTRACT

An improved micro-financing platform to fund principally new ideas, startups, and/or SMEs using a new type of instant game of chance ticket or on-line game is described. In accordance with an exemplary embodiment, the instant game of chance ticket or an on-line game token will comprise a gaming component and an investment component. In one scenario, the gaming component is the traditional game feature offered by an instant game of chance ticket or on-line game. The investment component of a ticket is the investment value of a ticket or on-line game as a function of the face value paid for the ticket. This investment value is a sort of micro-financing investment made by the purchaser in return for which the purchaser is given a share interest in an investment pool of companies very similar to traditional share ownership in a company, or the purchase of a corporate bond exercisable at a future date in exchange for, hopefully, greater value than what was given to acquire in the first place.

20 Claims, 13 Drawing Sheets

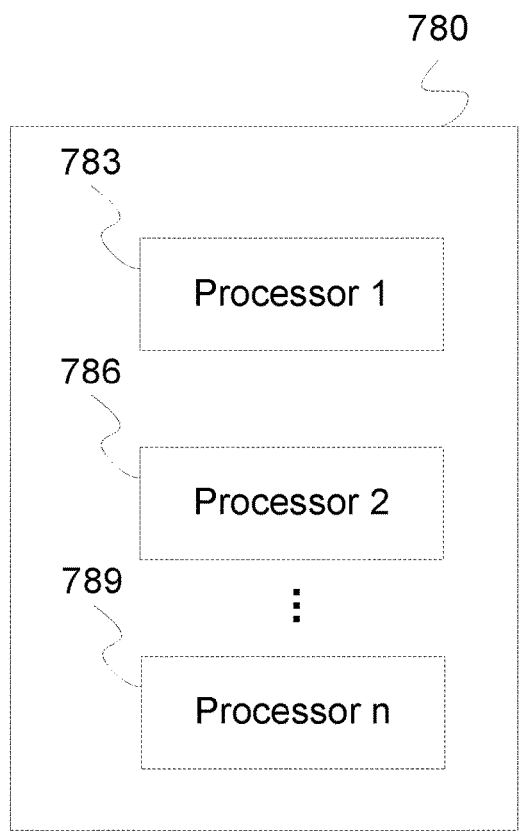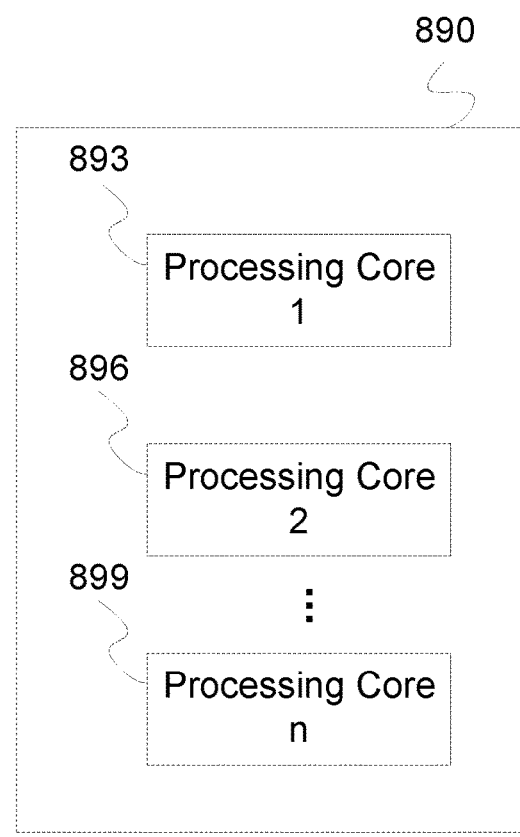
FIG. 7     FIG. 8

MICRO-FINANCING PLATFORM FOR POOLED INVESTING BASED ON PURCHASE OF GAME OF CHANCE TICKETS OR TOKENS OF KNOWN FACE VALUE

RELATED APPLICATIONS

This application is a continuation-in-part and claims the benefit of U.S. Non-Provisional patent application Ser. No. 15/846,848, filed Dec. 19, 2017, which claims the benefit of U.S. Provisional Application No. 62/436,979, filed Dec. 20, 2016.

FIELD

The present disclosure relates to micro-financing type platforms, and in particular to platforms for managing micro-investments using instant game of chance tickets.

BACKGROUND

The success and legalization of crowd funding for micro-financing type investments has made it possible for amateur investors and young entrepreneurs with limited funding to be able to join forces for the first time.

Micro-financing platforms have also appeared which enable amateur investors or investors with limited financial means to invest in corporations listed in Stock Exchanges, mainly by pooling the micro-funds of each micro-investor before an investment can be made.

A special category of investments exists in the energy industry where huge changes have occurred in recent years with the legalization and success of Local Energy Communities (including Renewable Energy Cooperatives). In general, the introduction of Distributed Virtual Power Plants has enabled local micro-producers to install renewable energy generators at their houses and properties and produce electricity for their own needs, selling excess production to the grid. Such kind of producers-consumers, are usually termer "prosumers" and are a fundamental element of the ongoing transformation of energy markets.

This change in energy markets has triggered interest and made it possible for amateur investors and young entrepreneurs to enter in coalitions (targeting both Renewable Energy Communities and Citizen Energy Communities) for maximizing their coalition benefits from participation in relevant energy-related markets. As of today, the energy landscape is calling for changes in the way energy is produced, distributed and managed. In this context, the concept of local, "green" energy communities (LECs) based on renewable energy resources has emerged. LECs are a key pillar in the energy democratization, for giving access to smaller consumers and prosumers to actively participate in functions such as selling and trading, and collective self-consuming, which previously were only available to large industrial market players.

The present invention reinforces the coalitions made within Local Energy Communities with crowd funding mechanisms through the introduction of novel micro-financing schemes addressing the price volatility and other risks related to the participation in relevant energy markets.

Despite the previously mentioned technological developments in the form of micro-investment platforms or micro-financing platforms and market developments in the form of micro-investments, crowdfunding and LECs, micro-investments are still not very appealing to the general public. The average individual is not risk prone, and more often than not prefers to "invest" his money to consumer goods, entertainment, gambling and games of chance, real estate, etc. As a result, only a small fraction of average individuals considers investing their money through micro-financing platforms. Apart from the risk involved in investments, it is common belief to most individuals that investments, even micro-investments, involve larger amounts of money than they typically could afford or are willing to invest. So, there are situations where an individual would like to invest in a company for a good cause (e.g. development of technology or offering services related to environmental protection, helping the poor, aiding third-world economies to develop, etc.) but he does not proceed with his investment for any of the reasons previously mentioned, or for reasons of transparency, lack of comprehensive and independent data on the investment prospects and on the entrepreneurs, etc.

There is, therefore, a problem to be solved, the problem being how to bridge the needs of individuals to more effectively invest their limited available financial resources, with the needs of entrepreneurs for funds to finance their businesses, and how to give incentives to individuals to invest.

SUMMARY

The present invention expands on the notion of micro-investments by creating a new type of micro-financing vehicle that provides a fun, simple, and exciting way for amateur investors to invest in business ventures just starting out and looking for initial operating capital or businesses looking for capital to expand. The present disclosure is directed to a new micro-financing platform to fund principally new ideas, startups, SMEs, and/or LECs using the notion of games-of-chance and gambling like a new type of instant game of chance ticket, or a game in an on-line gaming site, both involving a gaming and an investment portion. The investment portion is reserved for micro-investments through the present innovative micro-financing platform, and the gaming portion is reserved from games of change, while potential gains of the gaming portion can be re-invested by first adding them to the investment portion. This approach uses the gaming portion as a promotional and facilitation vehicle for micro-investing.

An instant game of chance ticket is a scratch card bought from a normal retail establishment, a lotto ticket purchased from a retail gaming operator, an in-play sports betting ticket, or the like. The place of purchase could be a commercial (gaming or non-gaming establishment) or could be a non-commercial venue (church, university, non-profit organization). Similarly, the motivation of the buyer of an instant game of chance ticket may also be philanthropic or profit-motivated.

In another aspect, an instant game of chance ticket can be an electronic instant game of chance ticket bought from an online gaming platform, or from an online gaming site. In yet another aspect, the instant game of chance ticket may be substituted with a virtual game of chance at an online gaming site, or other similar medium. For reasons of simplicity, where an instant game of chance ticket is mentioned, it is intended to mean any or all of a scratch card, an electronic instant game of chance ticket, a virtual game of chance, and a virtual game.

In accordance with an exemplary embodiment, the instant game of chance ticket will comprise a gaming component and an investment component. In one scenario, the gaming component is the traditional game feature offered by an instant game of chance ticket. The investment component of a ticket is the investment value of a ticket as a function of the face value paid for the ticket. This investment value is a sort of micro-financing investment made by the purchaser in return for which he is given a share interest in a pool of companies very similar to traditional share ownership in a company; or the purchase of a corporate bond exercisable at a future date in exchange for, hopefully, greater value than what was given to acquire in the first place.

In the scenario of a virtual (i.e. online) game of chance, the bet for each game could be made of a gaming component and an investment component, similar to the instant game of chance ticket. Alternatively, the virtual game of chance earnings when winning the game, could be set to consist of a gaming component and an investment component, similar to the instant game of chance ticket.

These and other features and advantages of the present invention will be apparent from the description of exemplary embodiments provided herein.

The present micro-financing platform collects investor data from the servers of the gaming operator and optionally from a digital wallet, company data from the servers of crowdfunding, venture capital/investment fund, energy market, and other operators' external servers and uses these data together with financial data from the servers of the stock exchange, energy exchange, financial institutions, credit/prepaid card companies, analyst companies, individual analysts, and web servers like news servers etc. around the Internet to create pools of companies for investing the investment portions owned by the micro-investors.

BRIEF DESCRIPTION OF THE DRAWINGS

FIG. 7 shows a computing apparatus or system for implementing the present innovative solution using multiple processors.

FIG. 8 shows a computing apparatus or system for the present innovative solution using multiple processing cores.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The following description is intended to convey a thorough understanding of the embodiments described by providing a number of specific embodiments and details involving methods and systems for managing content submission and publication of content. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The terms "micro-financing" and "micro-investment" in their singular and plural forms are used interchangeably in the present description and refer to the investments made by investors with small or very small financial resources available for investing.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

The present disclosure is directed to a new micro-financing platform to fund principally new ideas, startups, SMEs, LECs, etc. using a new type of instant game of chance ticket. In one aspect, an instant game of chance ticket is a scratch card bought from a normal retail establishment, a lotto ticket purchased from a retail gaming operator, an in-play sports betting ticket, or the like. The place of purchase could be a commercial (gaming or non-gaming establishment) or could be a non-commercial venue (church, university, non-profit organization). Similarly, the motivation of the buyer of an instant game of chance ticket may also be philanthropic or profit-motivated.

Micro-Financing System

Figure 1:
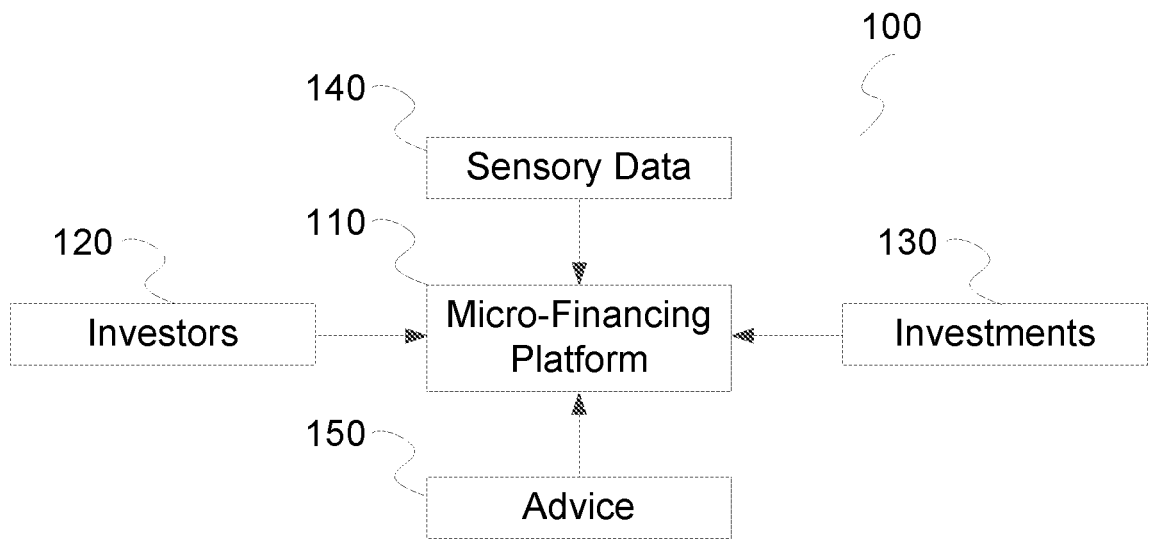
FIG. 1 shows a high-level diagram of an exemplary micro-financing system according to the present innovative solution.

FIG. 1 shows a high-level diagram of an exemplary micro-financing system according to the present innovative solution. Micro-financing system 100, consists of a micro-financing platform 110, connected with one or more investor computing apparatuses 120, one or more investment computing apparatuses 130, one or more sensor computing apparatuses 140, and one or more advice computing apparatuses 150.

Investor computing apparatuses 120 may be any type of computing apparatus used by a micro-investor to gain access to micro-financing platform 110 for creating an account, registering an instant game of chance ticket, selecting, managing and monetizing one or more micro investments, and gaining access to data like investment reports, investment ratings, investment opinions, etc.

Investment computing apparatuses 130, may be implemented as any type of computing apparatus owned by a company, cooperative, fund platform, crowdsource platform, etc. which computing apparatus handles all data related to an incoming investment.

Sensor computing apparatuses 140 may be implemented as any type of sensor, data analysis platform, etc. In one aspect sensor computing apparatuses 140 may be implemented as a set of meteorological sensors related to the installation site of a set of renewable energy producers and consumers and their available distributed energy resources (i.e. storage capacity in addition to RES availability), a data broker or forecaster for the demand and price of electrical energy or of the price of a company share or bond, etc. Sensor computing apparatuses 140 may capture data either from physical sensors or receive data from third-party sensors or data sources like databases holding historical, financial or other data, which sensor computing apparatuses 140 analyze and process to create structured information. Such information may, for example include the present value of a company share, the spot price of electricity, the estimate future price of a company bond or of the price of electricity, etc. Such analysis may be performed with human intervention or automatically with use of statistical data analysis methods, natural language understanding methods, etc., which are implemented either with dedicated hardware and/or software modules (e.g. neural networks, machine learning, artificial intelligence, etc.) inside sensor computing apparatuses 140, or are accessible as web services offered by third party servers, distributed servers, or cloud servers, etc.

Advice computing apparatuses 150 may be implemented as any type of computing apparatus used by a third-party analysis or rating company to provide financial advice, ratings etc. to the advice computing apparatuses 150.

Figure 2:
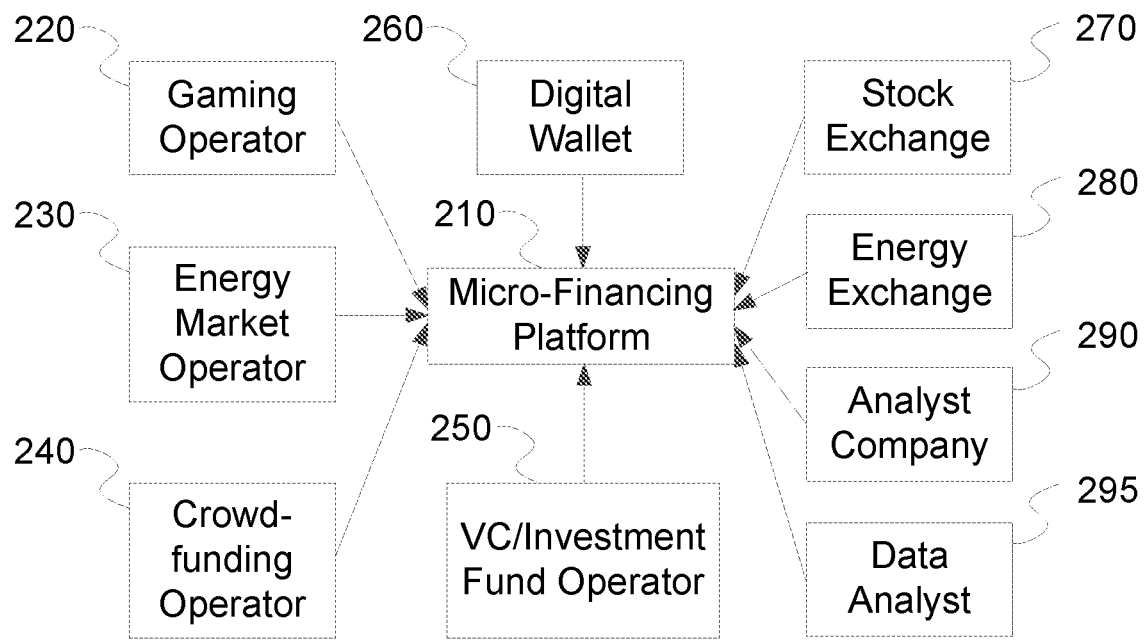
FIG. 2 shows a system diagram based on an exemplary micro-financing platform, including details of the type of users accessing the micro-financing platform.

FIG. 2 shows a system diagram based on an exemplary micro-financing platform, including details of the type of users accessing the micro-financing platform. System 200 is built around micro-financing platform 210, which allows micro-investors to connect and make investments by first buying an instant game of chance ticket for a physical or on-line vendor. The ticket is registered at a gaming operator 220, who in one aspect is an on-line vendor. The micro-investor may purchase either a scratch-card, an electronic scratch card, an electronic ticket, play coins for a slot machine, virtual coins or points for an on-line (i.e. virtual) slot machine or gaming site (e.g. virtual card or betting games), or gamification platform (like an on-line or virtual game, or an online or virtual game associated with a bet).

The ticket has a face value (i.e. the value paid by the micro-investor), which is split into a gaming portion and a micro-investment portion. This way, the individual buying the ticket, who may not be familiar with investments or who is reluctant to take an investment decision, is given an incentive to invest a small amount of money (i.e. the micro-investment portion of the ticket) while playing a game of chance which he is accustomed to. Upon the micro-investor creating an account with the micro-financing platform 210 and registering his ticket, the micro-investment portion is requested from gaming operator 220 by the micro-financing platform 210.

In case of winning the game, the return of the gaming portion may (fully or partially) either be kept in escrow at gaming operator 220, or used to buy a new ticket, or sent to micro-financing platform 210 for increasing the micro-investor's investments. A similar situation exists in energy markets for the LEC members participating in such micro-investments for intra (e.g. share increases within the LEC) or inter investing (e.g. new investments in energy but also to other pools if needed).

Micro-financing platform 210 stores the investment portions associated with the micro-investors and invests them in one or more pool of investments, where each pool corresponds to a category of companies, or to a single company. The creation of the pools of companies is done by micro-financing platform 210, while the choice of pools of companies where the micro-investor's funds will be invested is done based on the micro-investor's preferences, or direct choice, or automatically by micro-financing platform 210. Investments may be directed to companies managed by energy market operators 230, crowdfunding operators 240, or Venture Capital (VC) or investment funds 250, stock exchange 270, or energy exchange 280.

Energy market operators 230 manage entities that include local energy communities, renewable energy cooperatives, distributed virtual power plants, citizen energy communities, energy consumers, and the like. Crowdfunding operators 240 manage entities include startup companies, enterprises still in the process of founding and represented by the respective entrepreneurs, alliances of enterprises still in the process of founding, consortiums of companies, Small and Medium Enterprises (SMEs), big privately-owned companies, non-profit organizations, etc. VCs or investment funds 250 include all types of funds investing money in any phase of corporate development. Stock exchange 270 manages listed corporations receiving funding in the form of traded shares, Energy exchange 280 manages energy producers, micro-producers, virtual producers, and consumers through tradeable energy contracts.

For micro-financing platform 210 to select companies to invest the funds received via gaming operators, and to create investment pools with the selected companies, micro-financing platform 210 uses financial data, forecasts, analyses and opinions from stock exchange 270 (e.g. listed companies, pools of companies, stock indexes, parallel market data, etc.), energy exchange 280 (e.g. producers, energy communities, spot and option prices for electricity transactions, etc.), analyst companies 290 (e.g. raw company data, company reports, sector reports, ratings, opinions, etc.), and data analysts 295 (e.g. raw company data, company reports, sector reports, ratings, opinions, etc.).

In another aspect, micro-financing platform 210 also receives funds for investments from digital wallet 260, which is associated with the micro-investor and which funds the micro-investor may use to top up the investment portion of his ticket which funds (e.g. winnings of a game of chance) gaming operator 220 sends to micro-financing platform 210. Micro-financing platform 210 may be connected and associated with any account held by the micro-investor at one or more banks, credit or pre-paid card companies, virtual currency platform (e.g. Bitcoin, etc.), investment wallet held at an investment company, securities or other financial market instrument wallet, commodities trade wallet, stock exchange wallet or account, etc.

Implementation Details of the Micro-Financing Platform

Figure 3:
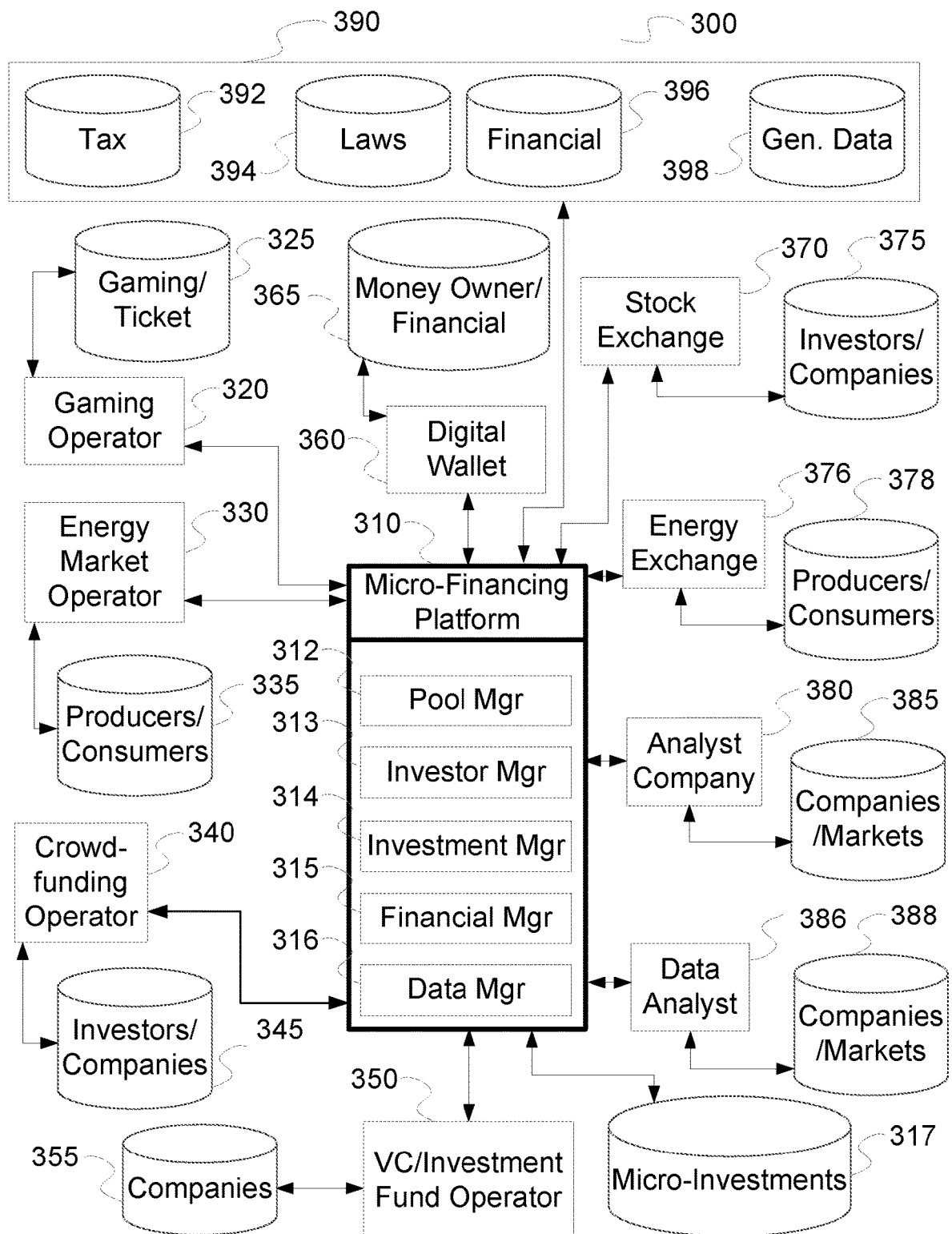
FIG. 3 shows a system diagram based on the exemplary micro-financing platform, including implementation details of the micro-financing platform.

FIG. 3 shows a system diagram based on the exemplary micro-financing platform, including implementation details of the micro-financing platform. System 300 connects micro-financing platform 310 with gaming operator server 320, energy market operator 330, crowdfunding operator server 340, VC/investment fund server 350, digital wallet server 360, stock exchange server 370, energy exchange server 376, analyst company server 380, data analyst server 386, and general third-party external servers or databases 390.

Servers 320-386 are connected to databases storing tables holding data associate with the servers. In particular, gaming operator server 320 is connected with database 325 holding gaming and/or ticket data, energy market operator 330 is connected with database 335 holding energy producer/consumer, LEC, energy prices, etc. data, crowdfunding operator server 340 is connected with database 345 holding company, company-to-be-formed, financial, and investor data, VC/investment fund server 350 is connected with database 355 holding company, financial and investor data, digital wallet server 360 is connected with database 365 holding money owner, financial, etc. data, stock exchange server 370 is connected with database 375 holding company and investment data, energy exchange server 376 is connected with database 378 holding energy producer/consumer, LEC, electricity price (including market price and RES price forecast), financial, etc. data, analyst company server 380 is connected with database 385 holding company, market and financial data, data analyst server 386 is connected with database 388 holding company, market and financial data, and general third-party databases 390, which include tax database 392 holding tax regulatory and financial data, legislation database 394 holding laws and regulation data, financial database 396 holding financial data, general data database 398 holding general data (e.g. news database, news server, or web server). In one aspect, the content of databases 390 is offered as data in database tables, data files in any text or structured text format (e.g. eXtensible Markup Language (XML)), ASCII data, web pages, etc. In another aspect databases 390 are replaced by webservers.

Micro-financing platform 310 is implemented in any computing device, including desktop or portable computers, server, distributed servers, cloud servers and the like. In one aspect micro-financing platform 310 is implemented as special-purpose hardware modules (e.g. Application-Specific Integrated Chips, dedicated special microprocessors, collection of more than one microchips or processors, etc.), software (including software in any programming language, descriptive programming language, microcode, etc.), or a combination of software and hardware, including general-purpose and purpose-built software and hardware. The modules of micro-financing platform 310 are either physical (i.e. in hardware), virtual (i.e. software), or hybrid (i.e. combination of hardware and software). Micro-financing platform 310 contains a company pool manager 312 that creates pools of companies for micro-financing, selects companies and enters the selected companies in the pools of companies for investment. Pool manager 312 uses investor data from investor manager 313 (e.g. investor preferences), financial manager 315, and data manager 316 to create a list of pools containing companies for investments.

Investor manager 313 receives data from gaming operator server 320 and digital wallet 360, which data are associated with the micro-investors, their financial assets for investment and investment preferences. In a variation of the present exemplary implementation, the investment preferences are set and communicated to micro-financing platform 310 by the micro-investor through his computing apparatus.

Investor manager 313 and pool manager 312 send data to investment manager 314, which also receives data from financial manager 315 and data manager 316 and selects a pool of companies for investment and an amount associated with the micro-investor that will be invested in the companies of the pool. The choice of investments is based on the preferences of the micro-investor, or if such preferences are not available, investment manager 314 automatically selects a pool of investments using financial data (e.g. present value, forecasts, future value) from financial manager 315 and general data (e.g. analysis, news, forecasts) from data manager 316.

Financial manager 315 receives data from any of the following servers and databases: energy market server 330, crowdfunding server 340, CV/investment server 350, stock exchange server 370, energy exchange server 376 (also including data for the LECs, e.g. day ahead electricity prices, etc. from server 376 and optionally from other servers), analyst company server 380, data analyst server 386, and tax server 392, legislation server 394, and financial server 396. Financial manager 315 analyzes the received data using machine learning, neural networks or other mathematical techniques known in prior for data analysis and aggregation and produces financial information and forecasts for the companies which it receives from servers 330-396.

Data manager 316 receives data from external servers 390, and especially data offered as web pages and applies data analysis, understanding and aggregation techniques using machine learning, neural networks, natural language understanding, and other mathematical techniques known in prior art for data analysis and aggregation.

The modules of micro-financing platform 310 store their processed data results in micro-investment database 317.

Figure 4:
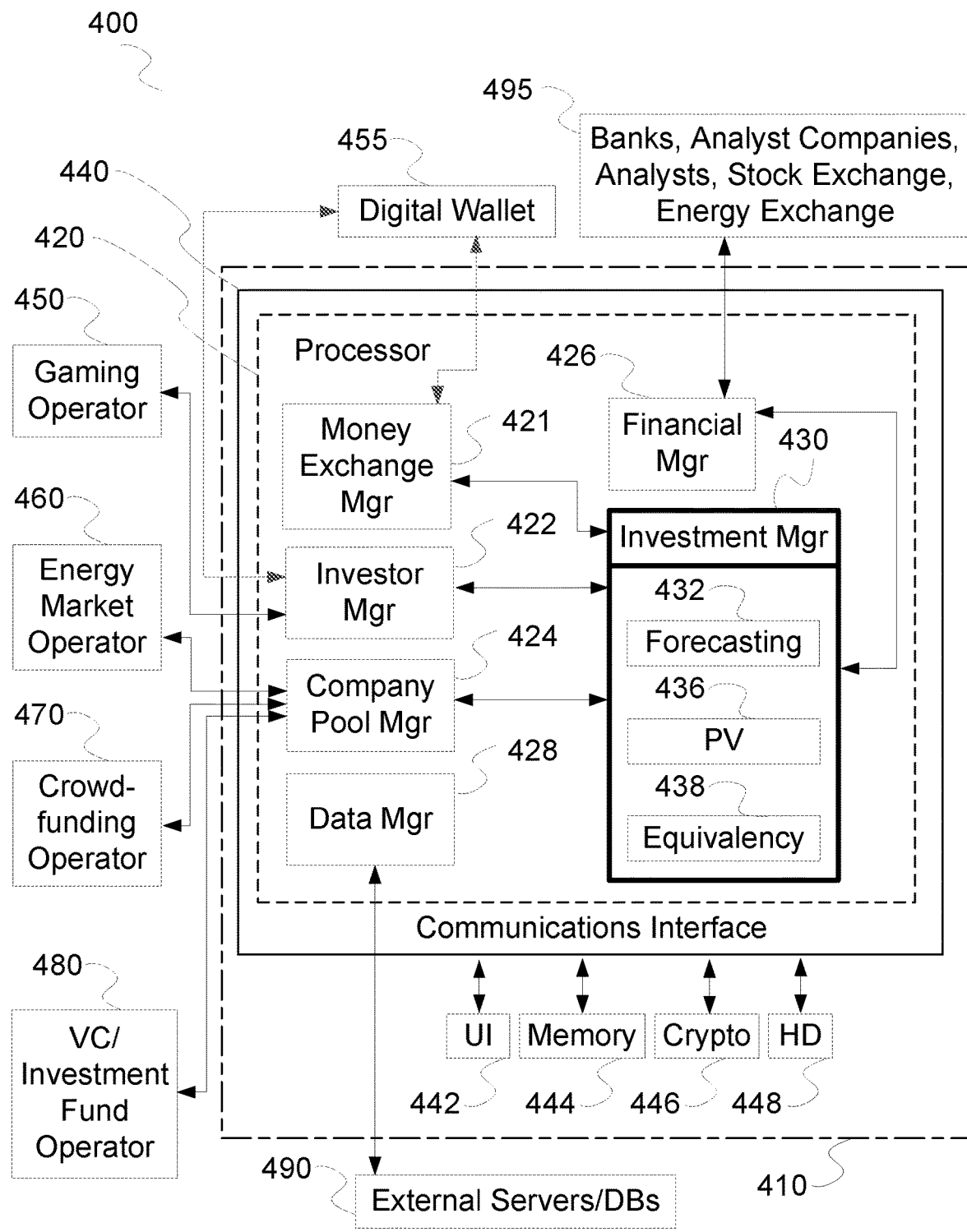
FIG. 4 shows a detailed exemplary hardware implementation of the micro-financing platform.

FIG. 4 shows a detailed exemplary hardware implementation of the micro-financing platform. Micro-financing platform 410 contains a processor 420 connected with a memory module 444 (implemented with any known volatile and/or non-volatile storage technology, e.g. RAM, ROM, EEPROM, etc.), a cryptography module 446 (i.e. an optional module implemented in hardware, software, or hardware and software using any known, standard or proprietary cryptography algorithm(s) for encrypting the communications with external servers and the data stored by micro-financing platform 410), a Hard Disk 448 (or other permanent storage module implemented in any known technology, e.g. magnetic, optical, solid state, etc.), and a User Interface (UI) module 442 (implemented with one or more of a touch screen and virtual keyboard, a physical keyboard, a mouse, a speech interface, and a gesture interface). Micro-financing platform 410 also contains a communications interface 440 for connecting and exchanging data with the servers of gaming operator 450, energy market operator 460, crowdfunding operator 470, VC/investment fund 480, and external servers and databases 490.

Micro-financing platform processor 420 is implemented as a set of hardware modules (some of the following modules may be omitted or merged with other modules):

- a money exchange manager 421 which communicates with (i) a digital wallet server 455 (e.g. a server at a bank, credit/prepaid card company, cryptocurrency etc. which holds the currency assets of the micro-investor), and (ii) with investment manager 430 for exchanging financial information (balance, credit and debit transactions, etc.)
- an investor manager 422 which communicates with gaming operator 450, and digital wallet 455 and collects micro-investor data (e.g. profiles, preferences, etc.)
- a company pool manager 424 which communicates with energy market operator 460, crowdfunding operator 470, and VC/investment fund 480 and collects and analyzes company details and creates investment pools of companies in various categories and according to various company pool criteria and micro-investor preferences a general data manager 428, which communicates with external servers and databases 490 and in general with web servers connected at the Internet, and collects and analyzes legal, tax, financial, energy price market, and news (raw and structured) data, creating structured information from the collected data using general data rules and natural language understanding concepts a financial manager 426, which communicates with servers 495 at banks, analyst companies, analysts, the stock exchange and the energy exchange, and collects and analyzes financial (raw and structured) data to produce structured financial information from the collected data using financial rules and natural language understanding concepts an investment manager 430, which is connected to and (i) receives structured information from the investor manager 422, financial manager 426, general data manager 428, company pool manager 424, (ii) analyzes micro-investor, company, financial, general, and pool companies structured information from the received structured information, for creating micro-investments associating the micro-investor, company, financial, general, and pool of companies structured information using investment rules Investment manager 430 is implemented as a set of hardware modules:

a forecasting module 432, which analyzes the data and the structured information received by investment manager 430 and creates forecasts a Present Value (PV) module 436, which uses structured information (e.g. average and historical interest rates from financial manager 426, forecasts from forecasting module 432, etc.) to calculate the PV of company shares, company bonds, etc.

equivalency module 438, which uses data and structured information from investment manager 430 (e.g. PV of a company shares and company bonds, and face value of the investment portion of an instant game of chance ticket held by a micro-investor or of an asset in his digital wallet) and calculates equivalencies between face value and PV In an alternative exemplary implementation, the hardware modules of processor 420 are implemented as a combination of hardware and software. In yet another alternative exemplary implementation, the hardware modules of processor 420 are implemented in software.

In one aspect, the modules of processor 420 are implemented in different processors, or in different processing cores of the same or different processors.

It is obvious to a reader of ordinary skill in related art that the implementation of micro-financing platform 410 may include additional modules which are not shown in FIG. 4 for simplicity and as these additional modules are obvious to a person of ordinary skill in related art and do not contribute to the understanding of the scope of the present innovative solution. It is also obvious that some of the modules of micro-financing platform 410 may be merged into a new module(s) and their operation may be performed by the new module(s).

Data Architecture

Figure 5:
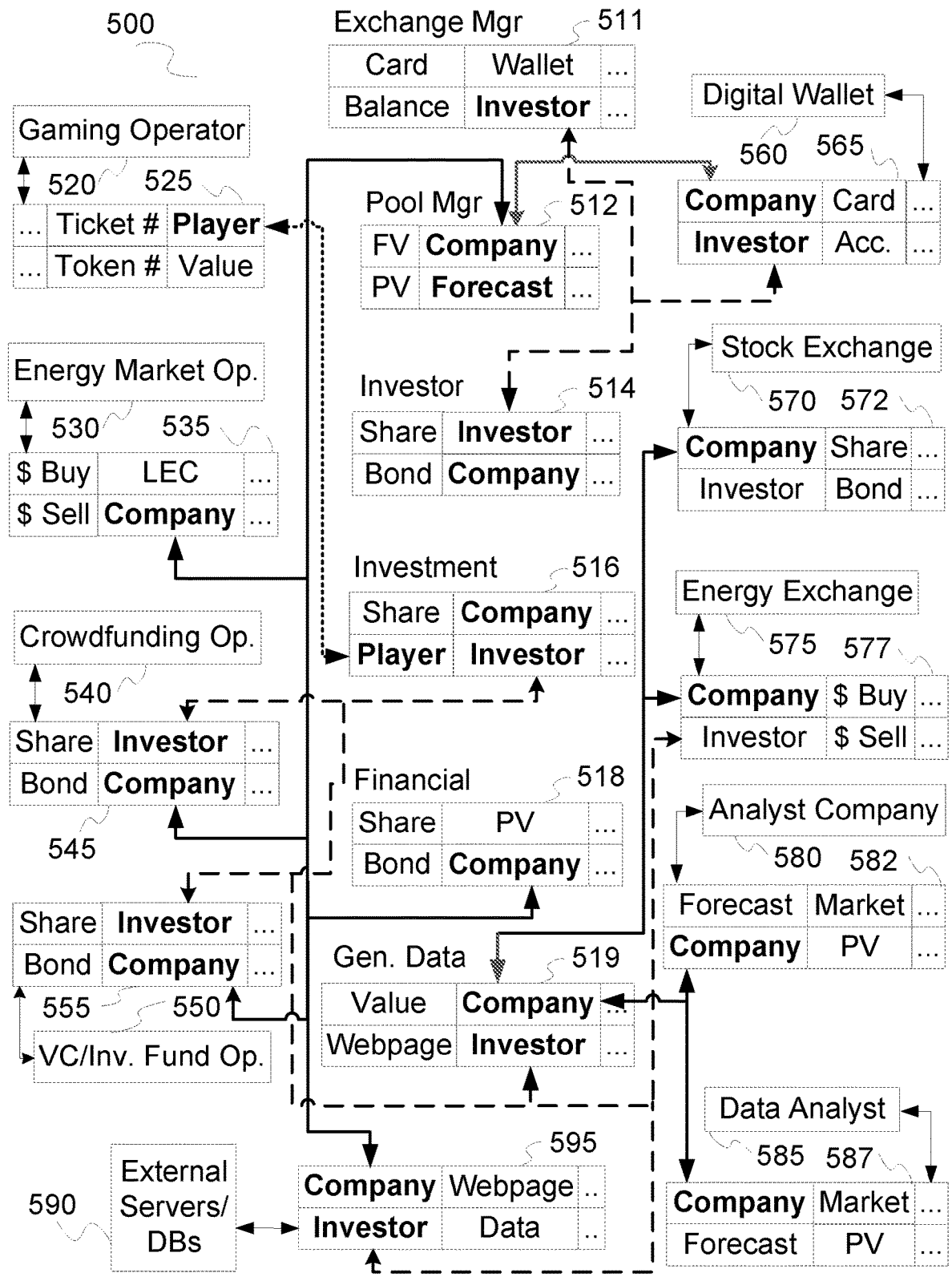
FIG. 5 shows an exemplary data architecture of the micro-financing system.

FIG. 5 shows an exemplary data architecture of the micro-financing system. Data architecture 500 is centered around the internal data architecture used by micro-financing platform 510, which is fed with data structures from other servers and databases. Data architecture 500 is implemented in the present exemplary implementation as database tables with common database keys used for associating data from one database table to data in another database table. This way data related e.g. to an investor or to a company in a pool of companies may be drawn by investment manager 430, and data updated in one table may be used to update associated date in another table). It is noted that the database tables, the data they hold, and the database keys are present only for exemplary purposes. A reader with ordinary skill in related art understands, that additional database tables may be used, the existing database tables may be split or merged, and different database keys may be selected without limiting the scope of the present innovative solution.

In alternative exemplary implementations, data architecture 500 may be implemented as linked lists, or data files of any format (e.g. XML, CSV, ASCII, etc.).

Inside micro-financing platform 510 are the following modules:

company pool manager 421 holding a company pool table 512, which contains a company account (or profile), the Face Value (FV) and the PV of the investment, forecasts, etc.

investor manager 424 holds an investor table 514, which contains an investor account (or profile), the company shares and bonds he holds, the FV and the PV of the company shares and bonds, etc.

investment manager 430 holds an investment table 516, which contains investor account (or profile), player account (or profile), investment events (e.g. buying/selling company shares/bonds, etc.), FV and PV of for the company shares and bonds, investor, etc.

financial manager 426 holds a financial table 518, which contains company accounts (or profiles), shares/bonds issued by the companies, FV/PV of the issued shares and bonds, etc.

money exchange manager 421 holds an exchange table 511, which contains digital wallet accounts, investor accounts (or profiles), balance, credit/prepaid card number, etc.

general data manager 428 holds a general data table 519, which contains company accounts (or profiles), investor accounts (or profiles), events (e.g. transaction), data (e.g. structured data extracted from web pages/external databases, etc. related to financial, tax, legislation etc. data in the web pages/external databases), FV/PV of a company share/bond (e.g. extracted web pages, or databases), etc.

In FIG. 5 database keys in the database tables 511-519 of micro-financing platform 510 are the same as the database keys used in the database tables help by the system modules connected with micro-financing platform 510:

gaming operator 520 holding gaming tables 525, which contains ticket number and FV of the tickets, or player account (or profile), player's balance (e.g. betting tokens or points), FV of betting tokens or points, and investment portion of the ticket or of the betting tokens or points for on-line games and on-line gaming sites energy market operator 530 holding energy market tables 535, which contains company account (or profile) for producers and consumers, spot and option values for buying and selling kWh of electricity, energy communities for producers and consumers, etc.

crowdfunding operator 540 holding crowdfunding tables 545, which contains company accounts (or profile), the company share/bonds the company has issued, and their FV and PV, and investor accounts (or profile), the company share/bonds the investor has bought, and their FV and PV, etc.

VC/investment fund 550 holding VC/investment fund tables 555, which holds company accounts (or profile), company shares the company has issued, and their FV and PV, and investor accounts (or profile), the company shares the investor has bought, and their FV and PV, etc.

digital wallet 560 holding digital wallet tables 565, which contain wallet account (or profile), value of the wallet account (or profile), investor account (or profile), credit or prepaid card number, balance, etc.

stock exchange 570 holding stock exchange tables 572, which contain company account (or profile), company shares and bonds and their FV, PV and investor owning them, etc.

energy exchange 575 holding energy exchange tables 577, which contain company accounts for producer and consumers, company account (or profile) for producers and consumers, spot and option values for buying and selling kWh of electricity, energy communities for producers and consumers, etc.

analyst company 580 holding analyst company tables 582, which contain company account (or profile) for the companies they analyze, shares/bonds issued by the companies and their PV, forecasts, market value, other structured data, etc.

data analyst 585 holding data analyst tables 587, which contain company account (or profile) for the companies they analyze, shares/bonds issued by the companies and their PV, forecasts, market value, other structured data, etc.

external servers/databases 590 holding external data tables 595, which contain links to (and/or the content of) web pages, raw and structured data archives, etc.

As an exemplary use case, we consider the dependencies and associations of an investment table 516. The "investor" value is the database key for investment table 516, which links table 516 with crowdfunding table 545 and VC/investment fund table 555, which also contains database key "investor" from which it draws data. Investment table 516 also has a second database key "company" with links it with financial table 518, which also contains database key "company".

Investment table 516 is also linked with crowdfunding table 545 of crowdfunding operator 540, and VC/investment fund table 555 of VC/investment fund 550 via the "investor" database key, with gaming table 525 of gaming operator 520 via the "player" database key, and with general data table 519 of micro-financing platform 510, which holds data associated with external sources 572, 577, 587, 595, via the "company" database key.

It is obvious to a reader of ordinary skill, the previous example and especially the contents and database keys of the databases of FIG. 5 are not optimized and various modifications to the contents of the databases and the database keys can be used without departing from the scope of the present innovative solution. Equally, the skilled reader may select to include additional database tables, merge existing database tables, rename the database tables and keys without departing from the scope of the present innovative solution.

Figure 6:
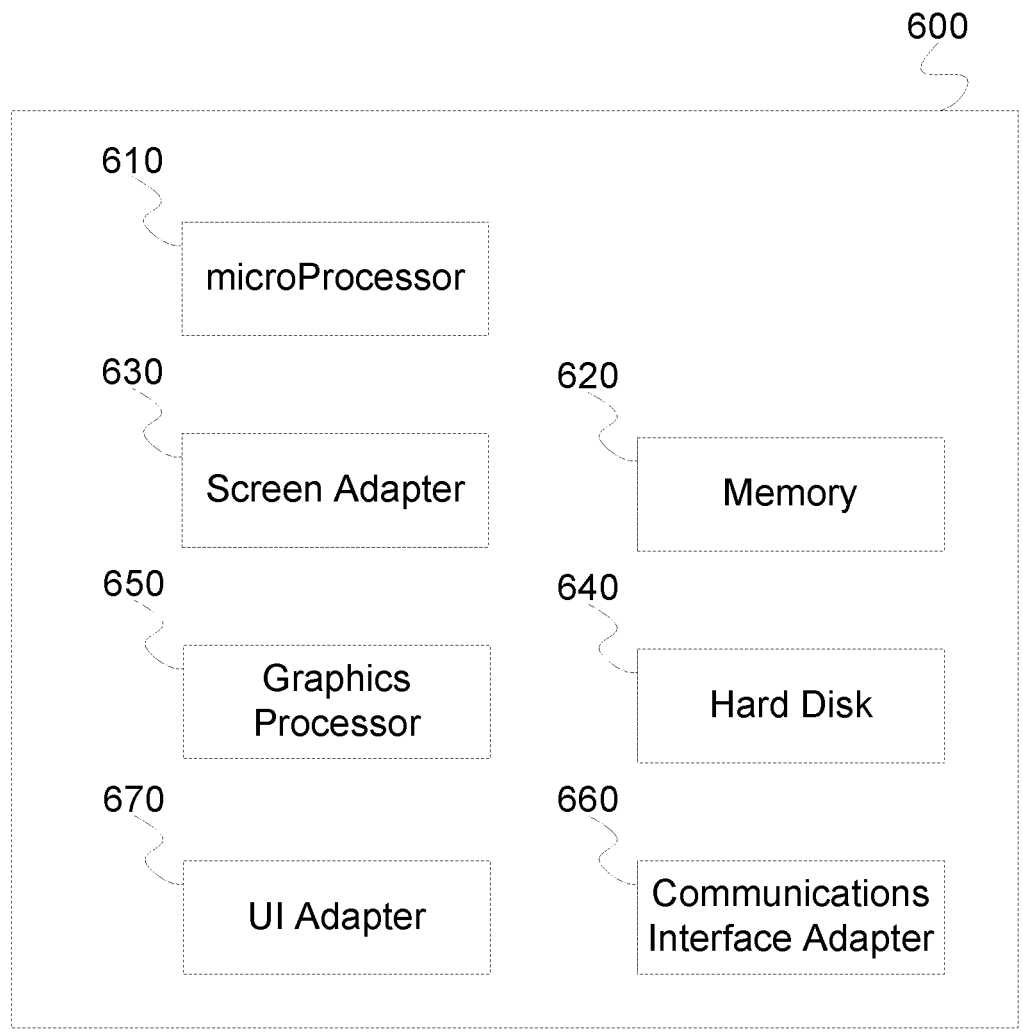
FIG. 6 shows the basic hardware architecture of an application server or other hardware implementing the present innovative solution.

Example Hardware Architecture of an Application Server or Other Server Implementing the Present Innovative Solution FIG. 6 shows the basic hardware architecture of an application server or other hardware implementing the present innovative solution. Application Server or other hardware 600 comprises a microprocessor 610, a memory 620, a screen adapter 630, a hard-disk 640, a graphics processor 650, a communications interface adapter (or communications module) 660, and a UI adapter 670. Application Server 600 may also contain other components which are not shown in FIG. 6 or lack some of the components shown in FIG. 6. Components 630, 640, 650, 670 are optional.

FIG. 7 shows a computing apparatus or system for implementing the present innovative solution using multiple processors. Computing apparatus or system 780 has more than one processor; processor_1 783, processor_2 786, . . . , processor_n 789. These processors are connected via a bus (not shown) and may function, in a first exemplary embodiment in a peer-to-peer setup, and in a second exemplary embodiment as a master-slave setup where one of the three processors acts as master and the other processors act as slaves. Processors 783, 786, 789 may be configured each to execute one or more modules.

The use of processors 783, 786, 789 allows faster operation times for the present system and allows concurrent use of multiple users while allowing easy scale up even at hot operation.

In other exemplary implementations, processor 783, 786, 789 may execute modules in a redundant mode to enable uninterrupted system operation in the event of hardware failure of any of processors 783, 786, 789. The use of processors 783, 786, 789 allows faster operation times.

FIG. 8 shows a computing apparatus or system for the present innovative solution using multiple processing cores. System 890 has more than one processing cores; processing-core_1 893, processing-core_2 896, . . . , processing-core_n 899. These processing cores are connected via a bus (not shown) and may function, in a first exemplary embodiment in a peer-to-peer setup, and in a second exemplary embodiment as a master-slave setup where one of the three processing cores acts as master and the other processors act as slaves. Processing cores 893, 896, 899 may be configured each to execute one or more modules 810.

The use of processing cores 893, 896, 899 allows faster operation times for the present system and allows concurrent use of multiple users while allowing easy scale up even at hot operation.

In other exemplary implementations, processor 783, 786, 789 may execute modules in a redundant mode to enable uninterrupted system operation in the event of hardware failure of any of processing cores 893, 896, 899. The use of processing cores 893, 896, 899 allows faster operation times for the present system.

In another exemplary embodiment, each or some of processors 783, 786, 799 have multiple processing cores like 893, 896, 899.

Example Software Components of an Application Server

Figure 9:
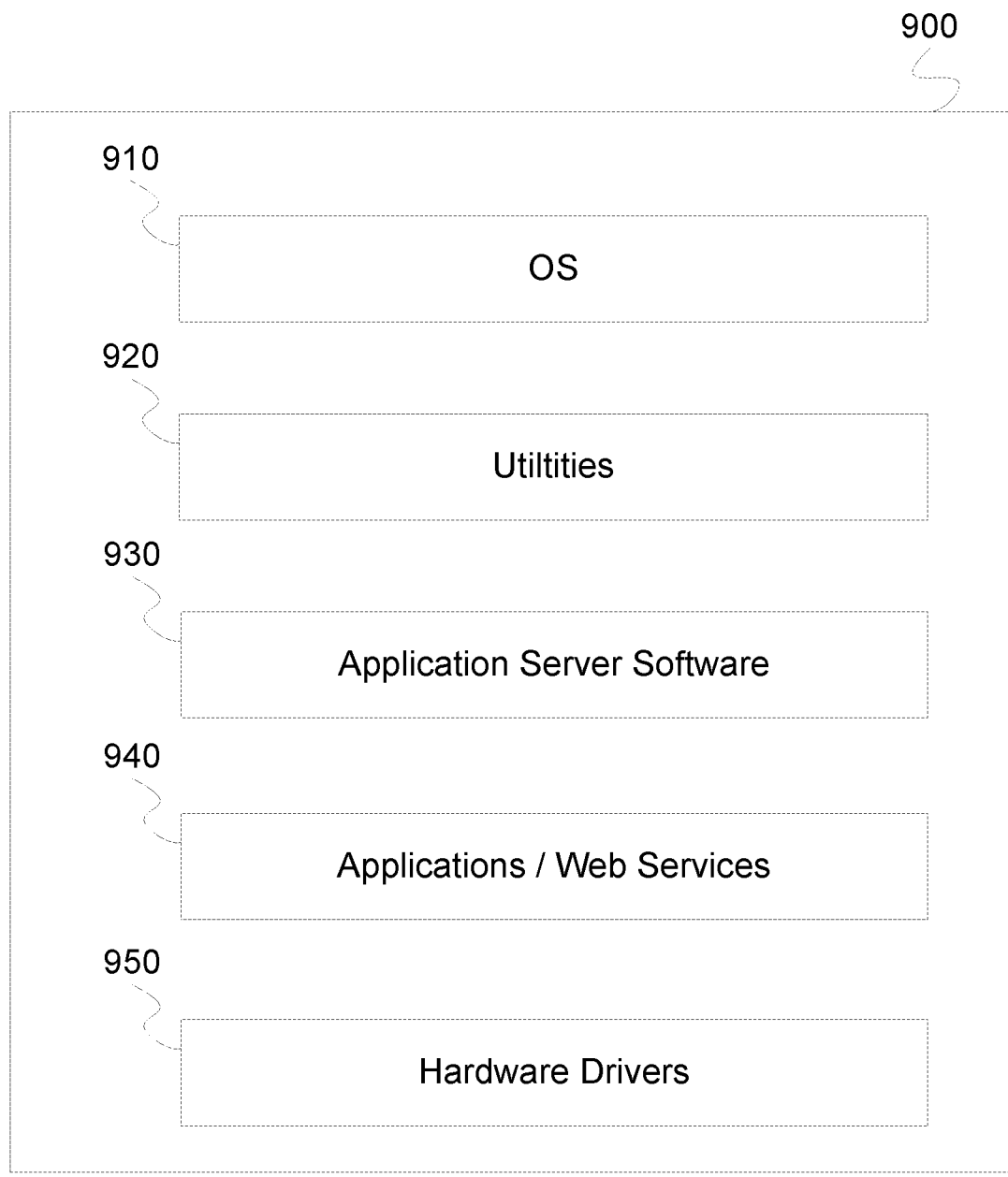
FIG. 9 shows the basic software components running on an application server or other hardware implementing the present innovative solution.

FIG. 9 shows the basic software components 900 running on an application server or other hardware implementing the present innovative solution. They comprise an Operating System (OS) 910, Utilities 920, Application Server Software 930, at least one Application or Web Service 940, and at least one Hardware driver 950. Additional software components may run at the application server while some of those shown in FIG. 9 may be omitted. One or more of software components 900 may be instantiated more than once to help speed up operation of the present system and support easy scale up to cater for the needs of several concurrent users.

Example Software Components of a Device

Figure 10:
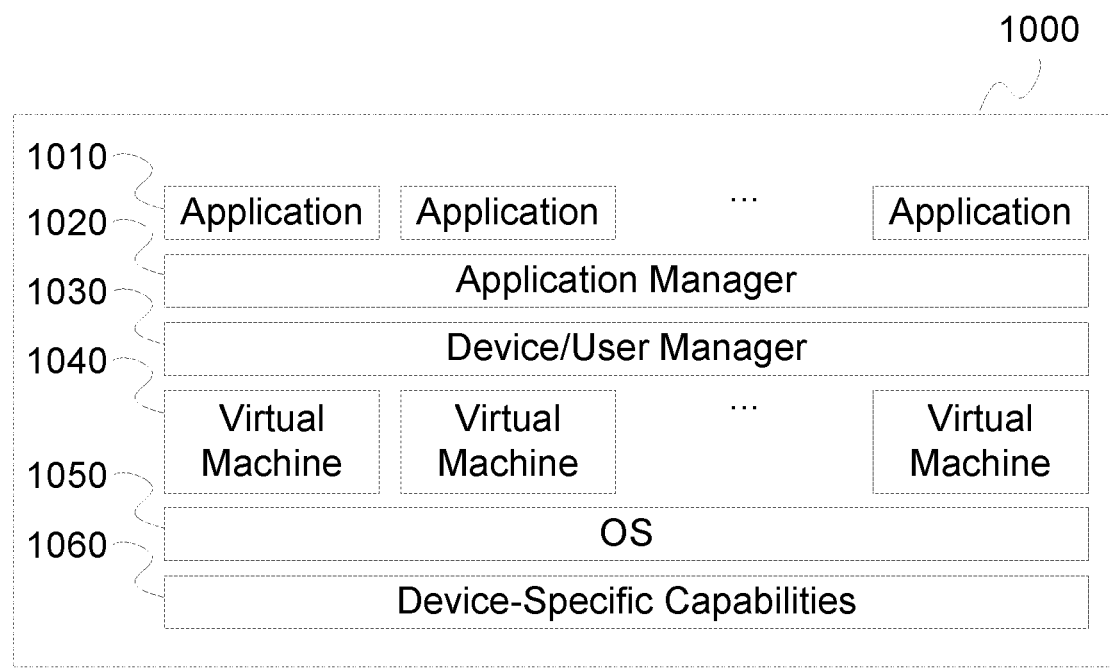
FIG. 10 shows the main Software Components of a computing device.

FIG. 10 shows the main Software Components of a computing device. At the lowest layer of software components 1000 are Device-Specific Capabilities 1060, that is the device-specific commands for controlling the various device hardware components. Moving to higher layers lie an OS

1050, Virtual Machines 1040 (like a Java Virtual Machine or other), Device/User Manager 1030, Application Manager 1020, and at the top layer, Applications 1010. These applications may access, manipulate, transform and display data and communicate with other devices and may use any protocol, standard or proprietary, used by the devices they run on or other devices or systems they connect to.

Figure 11:
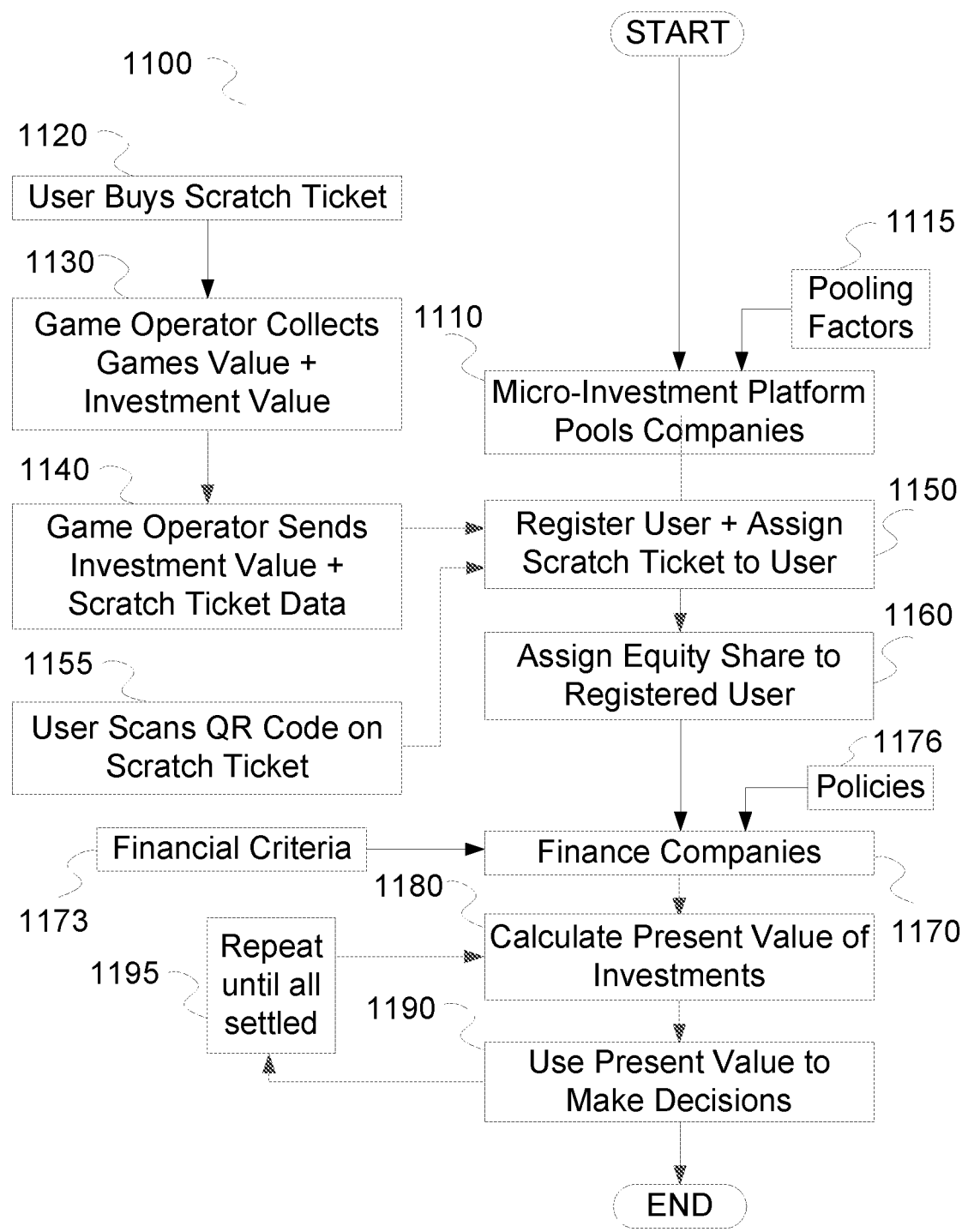
FIG. 11 shows a flow diagram of the main steps of managing the instant game of chance investments.

In accordance with an exemplary embodiment, the instant game of chance ticket will comprise a gaming component and an investment component. FIG. 11 shows a flow diagram of the main steps of managing the instant game of chance investments. In one scenario, the gaming component is the traditional game feature offered by an instant game of chance ticket. The investment component of a ticket is the investment value of a ticket as a function of the face value paid for the ticket. This investment value is a sort of micro-financing investment made by the purchaser in return for which he is given a share interest in a pool of companies very similar to traditional share ownership in a company; or the purchase of a corporate bond exercisable at a future date in exchange for, hopefully, greater value than what was given to acquire in the first place.

In an example scenario, a user purchases an instant scratch card (step 1120). The value of the equity interest bearing $5.00 instant scratch card is collected by the game operator (step 1130) and the value is allocated as follows: $3.00 which goes toward the purchase of the scratch card and is the gaming fee charged by the gaming operator responsible for promoting, selling and managing winnings associated with the scratch card ("the gaming component"); and $2.00 which is the separate and distinct investment value of the ticket.

In one aspect, the $2.00 is collected by the gaming operator and forwarded to the micro-financing platform together with instant scratch ticket data (e.g. a code) (in step 1140). Unlike traditional crowd funding where an investor selects the company he wishes to invest in, in the present case, the platform offerings are to a pool of companies that are preselected in step 1110. The pre-selection process can vary from platform to platform, or a platform could offer many different investment options. Examples of different investment options include the pooling of companies based on size, location, age of founders, age of company, technology focus, industry focus, revenues, green-friendliness, pay out risks, target number of investors, and many other similar factors, or combination of factors 1115.

Accordingly, users are availed of purchase selections which they can tailor to their own causes and/or interests. For example, a car enthusiast may select scratch cards with investment focus having to do with startups or SMEs in the auto industry; while an ecologist may select a green-friendly investment mix.

The pooling of the companies is predefined and established by the platform operator. The selection of the companies that go into a pool is similarly determined by a number of different factors. The selection could be random, first come first served, selected on the basis of a competition between initial applicants, and/or based on a voting scheme where selections are based on most votes received by platform members.

Accordingly, the investment component is an investment in a pool of companies very similar in nature to money market funds, except in a micro-financing type vehicle.

In one scenario, the game of chance is a ticket with a hidden identifier. A user purchases and scratches his ticket to reveal a hidden identifier code, e.g. a QR code, which code uniquely identifies his ticket. He then sends the code to the platform (e.g. manually entering the code). In an exemplary embodiment where a QR code is used, the user scans the QR code with his devices in step 1155 and sends it to micro-financing platform 310. Micro-financing Platform 310, 510 uses the received QR code and the data received from the game operator in step 1140 and registers the user (i.e. the owner of the ticket).

In a variation of the present exemplary embodiment, the user may have previously registered with the platform, before he sends the hidden code to the platform, e.g. when he bought another ticket at an earlier date or time.

In step 1150, the ticket will be matched to a registered platform member, at which time the ticket can be discarded. Once the ticket is registered with the platform, the ticket is no longer tradable by bearer. The registered owner will have to go on the platform and reassign it to another user. This is to protect against theft or possible tempering.

Micro-financing Platform 310, 510 then continues in step 1160 assigning an equity share to the user and finances companies in the pool (step 1170) according to financial criteria 1173 and policies 1176.

The idea is to make scratch card players also stakeholders in startups to help support a region's local innovation needs. In essence, we are talking about a new and different form of micro-financing. Of course, for there to be any payback on the $2.00 investment, the pool needs to be able to buy back the equity interest that it gave the scratch card holder in exchange for the $2.00. To do this, a mechanism is needed that forecasts the real market value of the $2.00 at the time the stakeholder wishes to convert his investment into cash or points (i.e. the investment's present value at that instant in time). This forecasting is done by the platform in step 1180 and the present value of the investment is used in step 290 to make investment and pooling decisions. Steps 1180, 1190 may be repeated at any time until all investment and pooling issues are resolved (step 1195) e.g. when a pool is ended.

The initial $2.00 equity interest may be traded on the platform by, for example, (a) having the platform facilitate buy/sell transactions between members (other scratch card stakeholders) similar to trading of interests in assets on crowd funding platforms; (b) the equity interest could be bought by the platform at an agreed (discounted) value to be resold, (c) it could be sold on the platform to the brokerage company that manages the pool; and/or (d) it could be traded for points to buy an equity interest in a different pool without necessarily having to physically go to a retailer and buy another scratch card for that different pool, and of course without having to invest $3.00 again on the gaming component associated with this "another" scratch card.

As should be clear, the use of a centralized platform to trade micro-financing investments as proposed can serve as a clever vehicle for a state to help promote innovation. The state (and/or corporations for that matter) can participate by matching investments, or offering favorable tax treatment for winnings, especially winnings that are reinvested for long periods into new pools.

The risk of failure of one company in the pool should be offset by the hopefully greater number of successful companies overall to make the risk-reward proposition particularly attractive.

Figure 12:
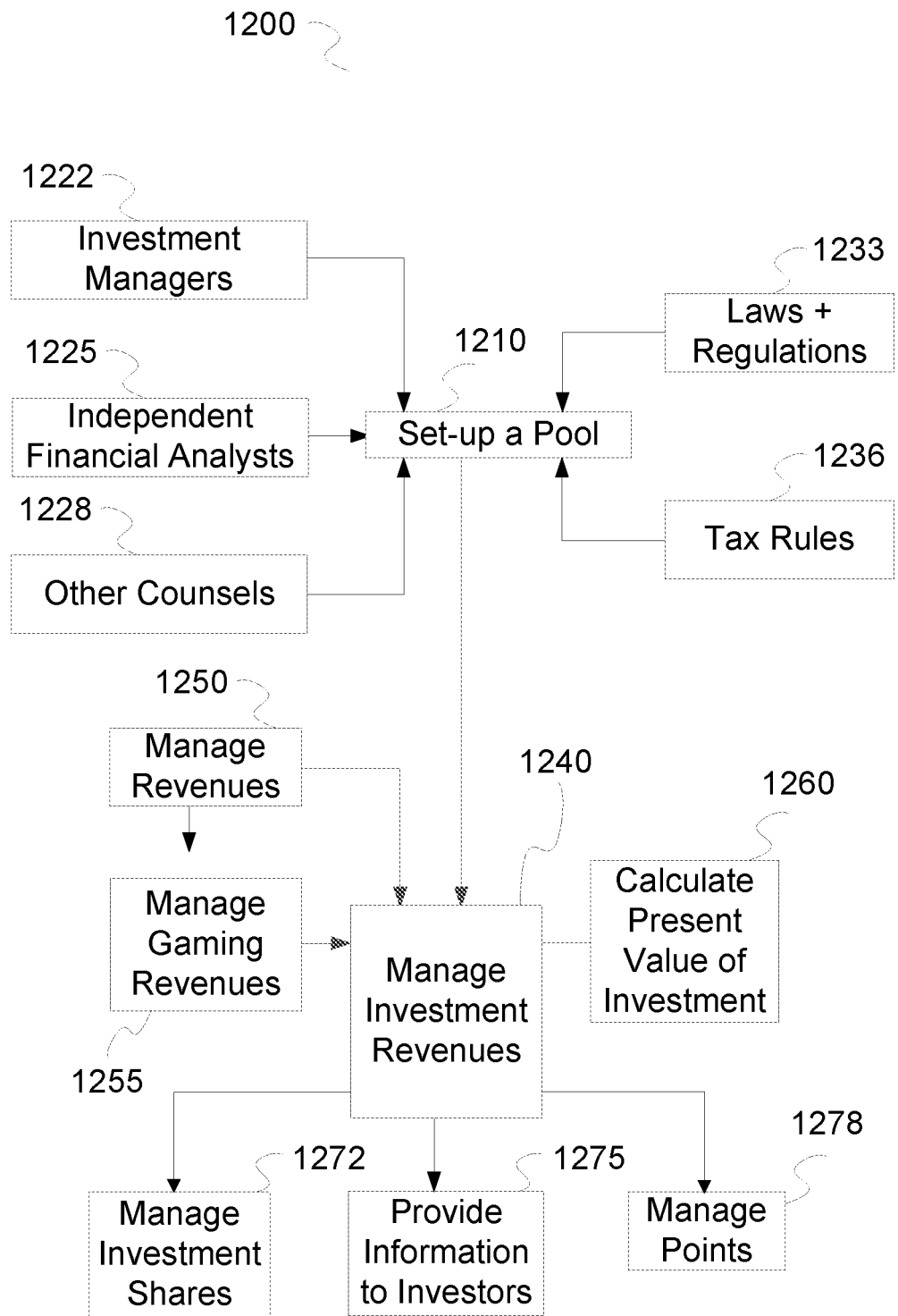
FIG. 12 shows the different stakeholder roles and actions for the micro-financing platform.

FIG. 12 shows the different stakeholder roles and actions for the micro-financing platform. The stakeholder roles and actions 1200 are given in a diagrammatic form to illustrate interactions. In one example implementation involving a pool (set-up in step 1210) consisting of ten fin-tech start-ups, a manager will manage the proceeds from ticket sales (step 1250). The pool of step 1210 is formed by using input from a plurality of stakeholders, including investment managers 1222, independent financial analysts 1225 and other counsels 1228, and using laws, regulations, and tax rules data from external servers/databases 390.

The proceeds to be managed include gaming revenues (step 1255) and investment revenues (step 1240). The investment revenues will flow to the start-ups from the collection and management of investment component monies collected from the sale of tickets, according to a criterion, e.g. in equal amounts AND only when a critical mass of tickets is collected. In another scenario, money may flow based on needs of each company, rank order based on number of highest votes (for example, first place gets a 20% premium above rest of companies in pool), or divided based on optimum investment value as determined by an independent financial advisor or investment manager entrusted with management responsibility over the pool.

Investment Revenue Management in step 1240 also uses as input the available pools from step 1210 and the present value of the investment from step 1260. Step 1240 uses all these input data to manage investment shares (step 1272) assigned to each ticket associated with a registered user, provide information to investors (step 1275), and manage investment points (step 1278) in exemplary embodiments, where the investment shares in companies of a pool are replaced with investment points for easier exchange of user ownership between investments and according to their present value at a specific time.

Figure 13:
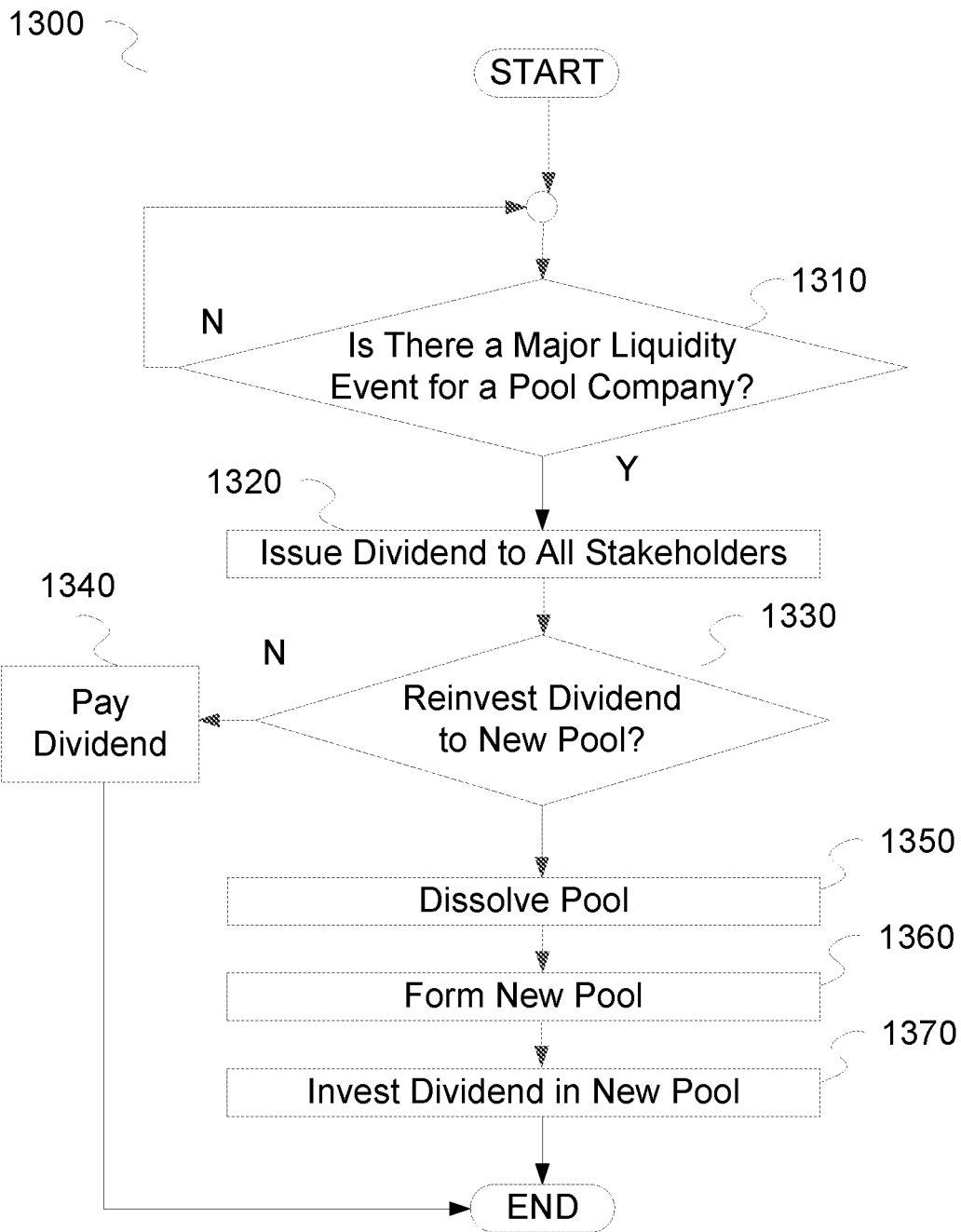
FIG.-13 shows how major liquidity events affect dividends.

FIG. 13 shown how major liquidity events affect dividends. Platform policies and/or specific policies associated with each pool specify when the pool can be liquidated, and/or when, if and how companies can enter or leave the pool, if at all. For example, when a major liquidity event happens for a company in the pool (Step 1310), dividends are issued (step 1320) and paid to all stakeholders (step 1340). If a decision is made to reinvest the dividend in a new pool (step 1320), the platform dissolves the existing pool (step 1350) and forms a new pool (step 1360) and gives the stakeholders of the former pool the option to acquire an interest in the new pool (step 1370) without giving back any money to stakeholders, this way the increase in capital flows to a new round of startups.

Figure 14:
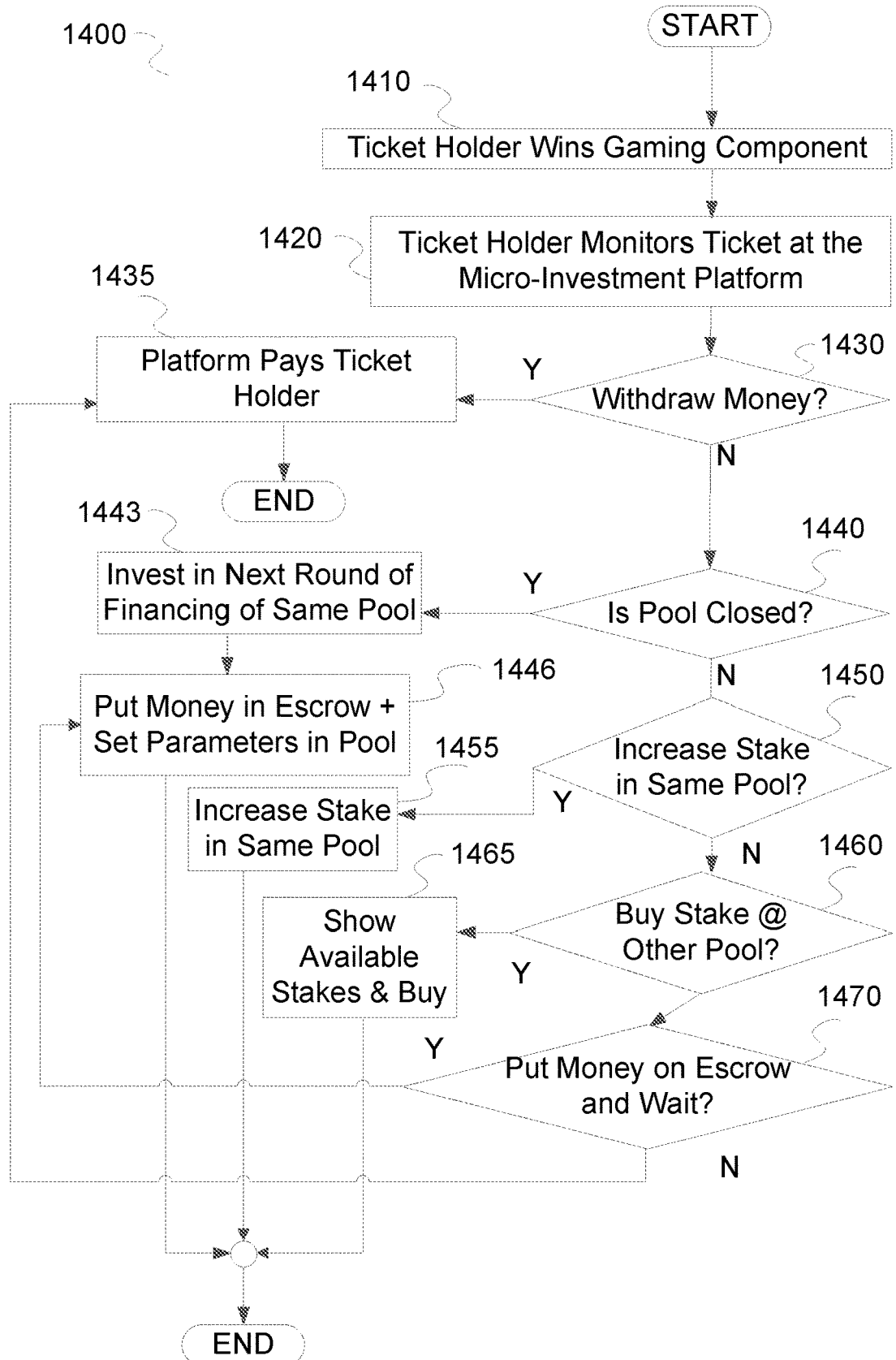
FIG. 14 shows an example of how gaming component winnings are handled.

FIG. 14 shows an example of how gaming component winnings are handled. The platform role is absolutely critical. In one scenario, gaming component winnings (step 1410) optionally or automatically also convert over to a corresponding investment value. This way, in addition to having acquired a $2.00 investment value in a pool of companies whose progress the user can see and monitor on the platform as a registered member (step 1420), the user can also increase his stake in the pool by not withdrawing his money (step 1430) or by having his winnings applied to invest in the next round of financing of the pool (step 1443) if the pool is closed. Since the next round of financing may not be before some time, the winnings are put in escrow until the investment is possible (step 1446); in the same step appropriate parameters are set in the platform to allow the platform to keep track of future investment opportunities for the money in escrow. If the pool is still open, the user can acquire an even greater stake in the current pool (steps 1450-1455). The user of the platform is also offered an opportunity to apply his winnings to another pool (step 1460), taking advantage of information of available stakes in this other pool shown to him by the platform and buying his selected stakes (step 1465). The user can also set aside the money, so it is held on escrow (1470, 1446) by the platform earning interest until he is ready to invest or withdraw it. If no selection is made or if the user chooses to withdraw his winnings in step 1430, the platform pays the ticket holder, i.e. the registered user (step 1435).

The platform operator provides a number of different functional roles. One such role is to set-up the pools making sure compliance with local laws and rules, manage tax issues, work closely with investment managers and financial advisors to make sure that pool offerings and prospectuses are available and appropriate. A second role is to operate the gaming component aspect of the ticket purchase to make sure that the winnings from those operations do not interfere with the investment component activities. In one scenario, the gaming activities are managed by a separate entity. The separate entity is any gaming operator, including an online gaming operator. The ticket offered by the gaming operator can be unique with different tickets corresponding to different pools available and supported by the platform. QR codes on each ticket may be used to provide on the spot, real time available information about a pool, including information about how close a pool is to meeting its investment goal. This way, before wagering on a scratch ticket, the user may wish to consider whether the pool is also a good investment on the basis of investor interest in the tickets sold for that pool to date.

In a related scenario, the investment value of the investment component of a ticket corresponds to a certain number of points. These points may vary as a function of pool maturity, success, changing risk-reward factors, a company having landed a huge client for example, or conversely, lost a big client, the announcement of an initial public offering (IPO) of a company, greater interest in that pool by the community (registered members) at large as opposed to other pools, interest by members to trade points into/or out of a pool, and many other factors. Based on these factors, in the $2.00 investment value example, on January 1 of year X, this $2.00 may translate into 200 points, whereas had the same $5.00 ticket been purchased six months earlier it may have translated to only 100 points (assuming pool is doing well), and 600 points, if in January it is faring poorly. In each instance, the intent is to reflect the present value of the $2.00 price attributed to the investment component. Historical information about the pool serves adds another level of strategy to ticket play, and thus extends the entertainment value associated with investing.

In yet a further scenario, the gaming and investment components being integral, the platform may provide information about the sales and chances of winning the gaming portion of the ticket. For example, assume that for a given pool, the target fund raising goal is $1M, and let's assume that all of the $500k winnings automatically convert to points. Let's also assume that all the gaming component value of the tickets sold goes to the gaming operator to support his activities plus a small profit. In this example, the total investment value of the tickets to be sold needs to be $500K, with the other $500k coming from the scratch winnings that will roll into the investment component. If tickets have been sold to the tune of $450k, meaning all but $50k remain to be sold, however, if out of those unsold tickets, there are more than $300k (of the $500k) in yet unpaid winnings, the odds of winning on one of the tickets remaining to be sold is much higher than average, which should make a pool more attractive over another pool where the opposite is true: i.e., the other pool has $450k in already distributed winnings and $200k in unsold tickets. This scheme could have the desirable benefit, from a social engineering standpoint, of encouraging millions of micro investors to support less popular and/or higher risk companies and ideas.

The above scheme also provides a measure of protection for the gaming operator who might have its scratch cards stolen, burned in a fire, or is simply unable to sell them, since the platform would provide a safety net against those eventualities, and also arrange for their reprinting by the gaming operator. In another scenario, the investment component not sold by traditional retail methods, may be offered online by the platform. In fact, the platform may make possible the parallel raising of capital for micro-financed pools on the platform.

The examples of FIG. 11-14 are presented for the (first) scenario of using scratch tickets of in instant game of chance as a means for giving incentives and simplifying micro-investments. The same examples are applicable to (the second) scenarios where the player of the instant game of chance is an on-line player at an on-line (virtual) instant game of chance, virtual gaming site, virtual game, virtual game involving betting, etc. In such a second scenario, the player does not use a scratch card but an account at the on-line game provider and tokens or points with a face value, which contain a betting/playing portion and an investment portion in analogy to the scratch card of the first scenario.

Energy Market Use Case

Figure 15:
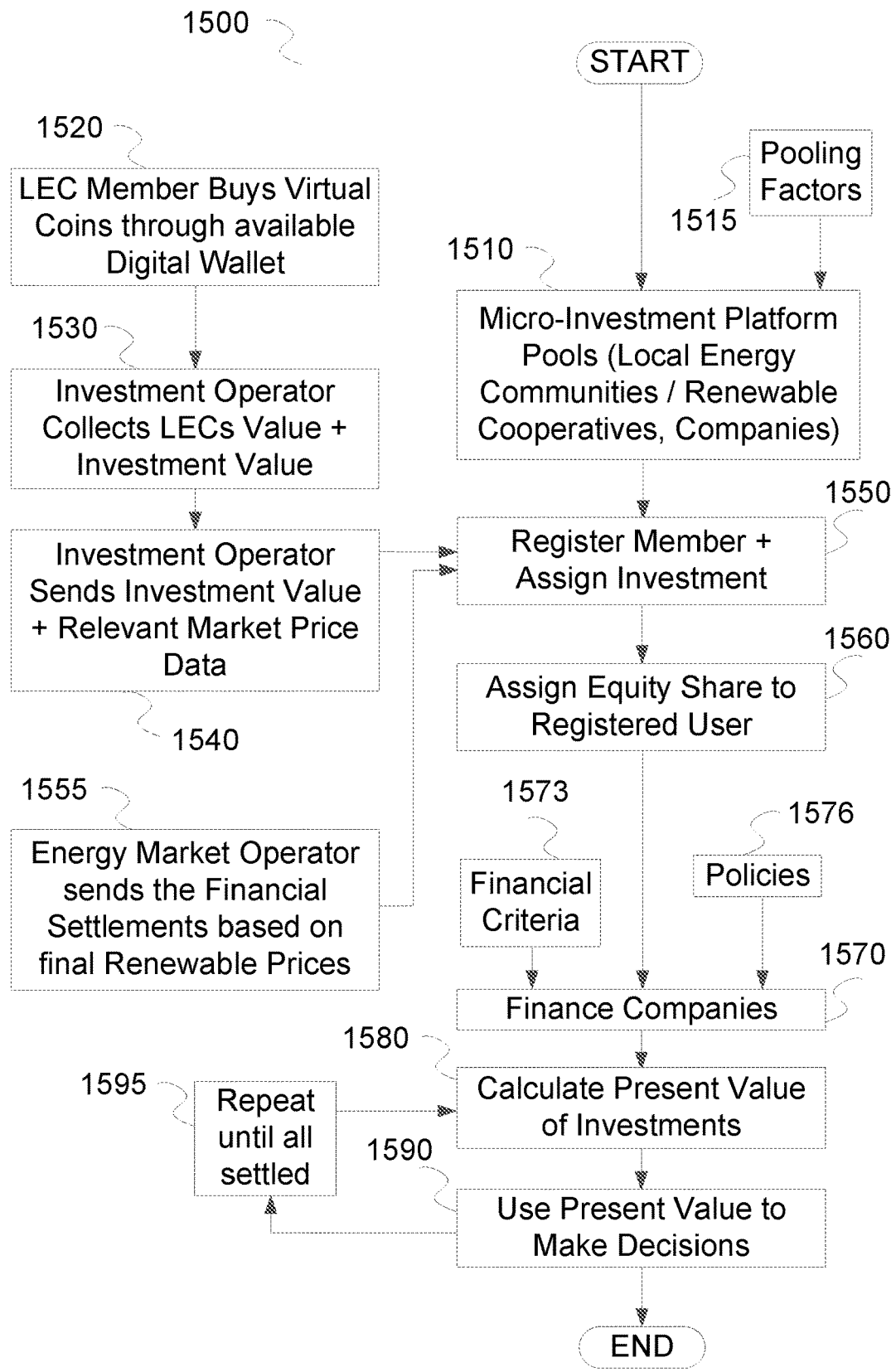
FIG. 15 shows an exemplary energy market use case flow diagram of the present innovative solution.

FIG. 15 shows an exemplary energy market use case flow diagram of the present innovative solution. An LEC member buys virtual coins through an available digital wallet 1520. The virtual coins have a gaming component and an investment component. The flow diagram contains the main steps of managing the LEC member's investments. In one scenario, the gaming component is a virtual game feature. The investment component of the coins is the investment value of the coins as a function of the face value paid for the coins. This investment value is a sort of micro-financing investment made by the purchaser in return for which he is given a share interest in an LEC (or other investment) in a pool of energy companies, contracts, producers, etc. very similar to traditional share ownership in a company; or the purchase of a corporate bond exercisable at a future date in exchange for, hopefully, greater value than what was given to acquire in the first place.

Having purchased the coins 1520, the value of the equity interest bearing $5.00 virtual coins is collected by the investment operator (step 1530) and the value is allocated as follows: $3.00 which goes toward the purchase of the virtual coins and is the gaming fee charged by the issuer for promoting, selling and managing winnings associated with the gaming component; and $2.00 which is the separate and distinct investment value of the ticket.

In one aspect, the $2.00 is collected by the gaming operator and forwarded to the micro-financing platform together with virtual coin data (e.g. a code) and relevant market price data (in step 1540). Unlike traditional crowd funding where an investor selects the company he wishes to invest in, in the present case, the platform offerings are to a pool of companies that are preselected in step 1510 using pooling factors 1515. The pre-selection process can vary from platform to platform, or a platform could offer many different investment options. Examples of different investment options include the pooling of companies/energy investments based on size, location, age of founders, age of company, technology focus, industry focus, revenues, green-friendliness, pay out risks, target number of investors, LECs, renewable cooperatives, and many other similar factors, or combination of factors 1515.

Accordingly, LEC members are availed of purchase/investment selections which they can tailor to their own causes and/or interests. For example, an LEC member with a preference in wind-generated green energy may select to invest in a local wind farm, etc.

The pooling of the companies, LECs, renewable cooperatives, etc. is predefined and established by the platform operator. The selection of the companies, producers, investments, etc. that go into a pool is similarly determined by a number of different factors. The selection could be random, first come first served, selected on the basis of a competition between initial applicants, and/or based on a voting scheme where selections are based on most votes received by platform members.

Accordingly, the investment component is an investment in a pool of companies, energy producers, investments etc. very similar in nature to money market funds, except in a micro-financing type vehicle.

In another aspect, the virtual coins may be replaced by a game of chance involving the purchase of a game of chance ticket with a hidden identifier. A user purchases and scratches his ticket to reveal a hidden identifier code, e.g. a QR code, which code uniquely identifies his ticket. He then sends the code to the platform (e.g. manually entering the code). In an exemplary embodiment where a QR code is used, the user scans the QR code with his mobile device and sends it to micro-financing platform. Micro-financing Platform 1510 uses the received QR code and the data received from the game operator in step 1540 and registers the user (i.e. the owner of the ticket).

In a variation of the present exemplary embodiment, the user may have previously registered with the platform, before he sends the hidden code to the platform, e.g. when he bought another ticket at an earlier date or time.

In step 1550, the virtual coins or the ticket number (or another identifier) will be matched to a registered platform member. In the case of a scratch ticket, the ticket can now be discarded.

The micro-financing platform then continues in step 1560 assigning an equity share to the user and finances companies, energy producers or cooperatives, etc. in the pool (step 1570) according to financial criteria 1573 and policies 1576.

The idea is to make LEC member the stakeholders in energy communities, cooperatives, startups, etc. to help support a region's local energy needs. In essence, we are talking about a new and different form of micro-financing. Of course, for there to be any payback on the $2.00 investment, the pool needs to be able to buy back the equity interest that it gave the LEC member in exchange for the $2.00. To do this, a mechanism is needed that forecasts the real market value of the $2.00 at the time the stakeholder wishes to convert his investment into cash or points (i.e. the investment's present value at that instant in time). This forecasting is done by the platform in step 1580 and the present value of the investment is used in step 1590 to make investment and pooling decisions. Steps 1580, 1590 may be repeated at any time until all investment and pooling issues are resolved (step 1595) e.g. when a pool is ended.

The initial $2.00 equity interest may be traded on the platform by, for example, (a) having the platform facilitate buy/sell transactions between members (other virtual coin or scratch card stakeholders) similar to trading of interests in assets on crowd funding platforms; (b) the equity interest could be bought by the platform at an agreed (discounted)

value to be resold, (c) it could be sold on the platform to the brokerage company that manages the pool; and/or (d) it could be traded for points to buy an equity interest in a different pool without necessarily having to physically go to a retailer and buy another scratch card for that different pool, and of course without having to invest $3.00 again on the gaming component associated with this "another" scratch card.

As should be clear, the use of a centralized platform to trade micro-financing energy investments as proposed can serve as a clever vehicle for a state to help promote green energy, local LECs and cooperatives. The state (and/or corporations for that matter) can participate by matching investments, or offering favorable tax treatment for winnings, especially winnings that are reinvested for long periods into new pools.

The risk of failure of one company, green energy producer, LEC or cooperative in the pool should be offset by the hopefully greater number of successful companies overall to make the risk-reward proposition particularly attractive.

It should be appreciated that while the above examples and scenarios have been described in connection with micro-financing investments (as the term is normally used and understood by the financial community), the same principles can be applied to traditional investing. The pools can comprise traditional, large market money funds of public companies or other type pools of equities, pooled option market offerings, pooled currency market offerings, pooled derivatives, different crypto-currencies, commodities and derivatives, among other things. Additionally, a pool can very simply be comprised of a single company in certain circumstances.

The platform may be configured as an independent operator charging commissions and profiting only from the trading of points between members and/or with the platform.

In addition, the platform may establish a network of mentors and relations with professional service providers, such as corporate counsel, patent attorneys, business developer experts, and others. All or a portion of the total collected investment capital from micro investors—from the sale of tickets—may instead be used to provide many pooled entities with free or discounted services. In exchange for agreeing to pull their money this way, each micro-investor may receive an appropriate equity investment in these companies.

Various embodiments of the invention are described above in the Detailed Description. While these descriptions directly describe the above embodiments, it is understood that those skilled in the art may conceive modifications and/or variations to the specific embodiments shown and described herein.

Any modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings.

The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A micro-financing platform, comprising:
   a memory module;
   a communications interface configured for connecting and exchanging data with a plurality of external servers;
   a processor connected with the memory module and the communications interface, where the processor contains at least one of:
   an investor manager configured for communicating through the communications interface with a gaming operator server and with a digital wallet server for collecting micro-investor data;
   a company pool manager configured for communicating through the communications interface with a plurality of external servers for collecting and analyzing company details and for creating at least one investment pool of companies in a plurality of categories and according to a plurality of company pool criteria and micro-investor preferences;

a general data manager configured for communicating through the communications interface with the plurality of external servers for collecting and analyzing at least one of legal, tax, financial, energy-related, and news raw and structured data, and for creating structured information from the analyzed data using a plurality of general data rules and a plurality of natural language understanding concepts;

a financial manager configured for communicating through the communications interface with the plurality of external servers for collecting and analyzing raw and structured financial data to produce structured financial information from the collected data using financial rules and natural language understanding concepts; and an investment manager connected to the investor manager, the financial manager, the general data manager, and the company pool manager for receiving the structured information, for analyzing micro-investor, company, financial, general, and company pool structured information from the received structured information, for creating micro-investments associating the micro-investor, company, financial, general, and company pool structured information using investment rules, and where the micro-investor structured information is associated with an investment portion of (i) a face value of an instant game of chance ticket, or (ii) a face value of a betting token or betting point, received from the an external server via the communications interface and the investor manager.

2. The micro-financing platform of claim 1, the micro-financing platform further comprising:

a money exchange manager configured for communicating (i) through the communications interface with the digital wallet server, and (ii) with the investment manager for exchanging financial information; and a cryptography module configured for encrypting (i) communications with the plurality of external servers and (ii) the data stored by the micro-financing platform, using at least one cryptography algorithm.

3. The micro-financing platform of claim 2, where the external servers comprise at least one of:

a bank server connected to a database holding account data, and financial data;

a credit card company server connected to a database holding credit card data, and financial data;

a prepaid card company server connected to a database holding prepaid card data, and financial data;

a cryptocurrency server connected to a database holding cryptocurrency data;

a gaming operator server connected to a database holding at least one of gaming data and instant game of chance ticket data;

an energy market operator server connected to a database holding energy producer, energy consumer, and local energy community data;

a crowdfunding operator server connected to a database holding company, company-to-be-formed, financial, and investor data;

a venture capital or investment fund server connected to a database holding company, financial and investor data;

a digital wallet server connected to a database holding money owner and financial data;

a stock exchange server connected to a database holding company and investment data;

an energy exchange server connected to a database holding energy producer, energy consumer, local energy community, electricity price, and financial data;

an analyst company server connected to a database holding company, market and financial data;

a data analyst server connected to a database holding company, market and financial data;

a tax server connected to a tax database holding tax regulatory and financial data, a legislation server connected to a legislation database 394 holding laws and regulation data;

a financial server connected to a financial database holding financial data; and a web server connected to a plurality of databases holding general data associated with web pages.

4. The micro-financing platform of claim 3, where the investment manager comprises at least one of:

a forecasting module configured for analyzing the data and the structured information received by the investment manager and for creating forecasts;

a Present Value (PV) module configured for using structured information for calculating a PV of company shares, and a PV of company bonds, where the structured information comprises average and historical interest rates from the financial manager, and forecasts from the forecasting module; and an equivalency module configured for using data and structured information from the investment manager, for calculating equivalents between a face value and the PV, where the data and structured information comprise a PV of company shares, a PV of company bonds, and one of (i) a face value of the investment portion of the instant game of chance ticket held by a micro-investor, and (ii) a face value of the investment portion of one of (a) the betting points, and (b) the betting scores stored in the digital wallet and associated with the micro-investor.

5. The micro-financing platform of claim 4, where the processor is implemented in one of the following configurations:

a processor with a processing core configured for implementing the modules of the processor;

a processor with a plurality of processing cores, where each of the plurality of processing cores is configured for implementing at least one of the modules of the processor;

a plurality of interconnected processors, where each of the plurality of interconnected processors is configured for implementing at least one of the modules of the processor; and a plurality of interconnected processors, where each of the plurality of interconnected processors comprises at least one processing core, and where each of the at least one processing core of the plurality of interconnected processors is configured for implementing at least one of the modules of the processor.

6. The micro-financing platform of claim 5, where:

the investor manager is configured for (i) requesting from the gaming operator server the face value of the investment portion associated with the game of chance ticket purchased by the micro-investor, or (ii) requesting from the digital wallet server one of (a) the face value of at least one betting point and (b) the face value of at least one betting token associated with the micro investor and converting the face value of (i) the investment portion associated with the game of chance ticket, or (ii) one of (a) the betting point and (b) the betting token associated with the micro investor, to a corresponding micro-investor interest in the investment pool of companies, where the game of chance ticket includes the gaming portion having a fixed value and the investment portion having the face value, and where the fixed value of the investment portion and the face value of the gaming portion correspond to a purchase value of the game of chance ticket.

7. The micro-financing platform of claim 6, where the investment manager is configured for:
calculating the present value of the micro-investment and of alternative micro-investments; and
exchanging the micro-investor interest in the investment pool of companies for a different interest in the same investment pool of companies or for an interest in another investment pool of companies.

8. The micro-financing platform of claim 7, where the investment manager is configured for reinvesting the winnings corresponding to the gaming portion into the same investment pool of companies or into another investment pool of companies, or into a combination of both investment pools of companies.

9. The micro-financing platform of claim 8, where the exchange of the micro-investor interest is done by the investment manager using legal, regulatory, tax, and financial structured information.

10. The micro-financing platform method of claim 9, where exchanging the micro-investor interest in the investment pool of companies for a different interest in the same investment pool of companies or for an interest in another investment pool of companies is done by first converting the micro-investor interest in the investment pool of companies into investment points.

11. A non-transitory computer program product having instructions that cause a micro-financing platform to use at least one of:
an investor manager configured for communicating through a communications interface with a gaming operator server and with a digital wallet server for collecting micro-investor data;
a company pool manager configured for communicating through the communications interface with a plurality of external servers for collecting and analyzing company details and for creating at least one investment pool of companies in a plurality of categories and according to a plurality of company pool criteria and micro-investor preferences;
a general data manager configured for communicating through the communications interface with the plurality of external servers for collecting and analyzing at least one of legal, tax, financial, energy-related, and news raw and structured data, and for creating structured information from the analyzed data using a plurality of general data rules and a plurality of natural language understanding concepts;
a financial manager configured for communicating through the communications interface with the plurality of external servers for collecting and analyzing raw and structured financial data to produce structured financial information from the collected data using financial rules and natural language understanding concepts; and
an investment manager connected to the investor manager, the financial manager, the general data manager, and the company pool manager for receiving the structured information, for analyzing micro-investor, company, financial, general, and company pool structured information from the received structured information, for creating micro-investments associating the micro-investor, company, financial, general, and company pool structured information using investment rules, and where the micro-investor structured information is associated with an investment portion of (i) a face value of an instant game of chance ticket, or (ii) a face value of a betting token or betting point, received from the an external server via the communications interface and the investor manager.

12. The non-transitory computer program product of claim 11, having further instructions that cause the micro-financing platform to use at least one of:
a money exchange manager configured for communicating (i) through the communications interface with the digital wallet server, and (ii) with the investment manager for exchanging financial information; and
a cryptography module configured for encrypting (i) communications with the plurality of external servers and (ii) the data stored by the micro-financing platform, using at least one cryptography algorithm.

13. The non-transitory computer program product of claim 12, where the external servers comprise at least one of:
a bank server connected to a database holding account data, and financial data;
a credit card company server connected to a database holding credit card data, and financial data;
a prepaid card company server connected to a database holding prepaid card data, and financial data;
a cryptocurrency server connected to a database holding cryptocurrency data;
a gaming operator server connected to a database holding at least one of gaming data and instant game of chance ticket data;
an energy market operator server connected to a database holding energy producer, energy consumer, and local energy community data;
a crowdfunding operator server connected to a database holding company, company-to-be-formed, financial, and investor data;
a venture capital or investment fund server connected to a database holding company, financial and investor data;
a digital wallet server connected to a database holding money owner and financial data;
a stock exchange server connected to a database holding company and investment data;
an energy exchange server connected to a database holding energy producer, energy consumer, local energy community, electricity price, and financial data;
an analyst company server connected to a database holding company, market and financial data;
a data analyst server connected to a database holding company, market and financial data;
a tax server connected to a tax database holding tax regulatory and financial data,
a legislation server connected to a legislation database 394 holding laws and regulation data;
a financial server connected to a financial database holding financial data; and
a web server connected to a plurality of databases holding general data associated with web pages.

14. The non-transitory computer program product of claim 13, having further instructions that cause the microfinancing platform to use the following modules inside the investment manager:
a forecasting module configured for analyzing the data and the structured information received by the investment manager and for creating forecasts;
a Present Value (PV) module configured for using structured information for calculating a PV of company shares, and a PV of company bonds, where the structured information comprises average and historical interest rates from the financial manager, and forecasts from the forecasting module; and
an equivalency module configured for using data and structured information from the investment manager, for calculating equivalents between a face value and the PV, where the data and structured information comprise a PV of company shares, a PV of company bonds, and one of (i) a face value of the investment portion of the instant game of chance ticket held by a micro-investor, and (ii) a face value of the investment portion of one of (a) the betting points, and (b) the betting scores stored in the digital wallet and associated with the micro-investor.

15. The non-transitory computer program product of claim 14, having further instructions that cause the microfinancing platform to:
command the investor manager to (i) request from the gaming operator server the face value of the investment portion associated with the game of chance ticket purchased the micro-investor, or (ii) request from the digital wallet server one of (a) the face value of at least one betting point and (b) the face value of at least one betting token associated with the micro investor and to convert the face value of (i) the investment portion associated with the game of chance ticket, or (ii) one of (a) the betting point and (b) the betting token associated with the micro investor, to a corresponding micro-investor interest in the investment pool of companies, where the game of chance ticket includes the gaming portion having a fixed value and the investment portion having the face value, and where the fixed value of the investment portion and the face value of the gaming portion correspond to a purchase value of the game of chance ticket; and
command the investment manager to use legal, regulatory, tax, and financial structured information for at least one of:
calculate the present value of the micro-investment and of alternative micro-investments, and to exchange the micro-investor interest in the investment pool of companies for a different interest in the same investment pool of companies or for an interest in another investment pool of companies;
reinvest the winnings corresponding to the gaming portion into the same investment pool of companies or into another investment pool of companies, or into a combination of both investment pools of companies; and
exchange the micro-investor interest in the investment pool of companies for a different interest in the same investment pool of companies or for an interest in another investment pool of companies by first converting the micro-investor interest in the investment pool of companies into investment points.

16. A computer-implemented method for using a microfinancing platform, comprising using:
an investor manager configured for communicating through a communications interface with a gaming operator server and with a digital wallet server for collecting micro-investor data;
a company pool manager configured for communicating through the communications interface with a plurality of external servers for collecting and analyzing company details and for creating at least one investment pool of companies in a plurality of categories and according to a plurality of company pool criteria and micro-investor preferences;
a general data manager configured for communicating through the communications interface with the plurality of external servers for collecting and analyzing at least one of legal, tax, financial, energy-related, and news raw and structured data, and for creating structured information from the analyzed data using a plurality of general data rules and a plurality of natural language understanding concepts;
a financial manager configured for communicating through the communications interface with the plurality of external servers for collecting and analyzing raw and structured financial data to produce structured financial information from the collected data using financial rules and natural language understanding concepts; and
an investment manager connected to the investor manager, the financial manager, the general data manager, and the company pool manager for receiving the structured information, for analyzing micro-investor, company, financial, general, and company pool structured information from the received structured information, for creating micro-investments associating the micro-investor, company, financial, general, and company pool structured information using investment rules, and where the micro-investor structured information is associated with an investment portion of (i) a face value of an instant game of chance ticket, or (ii) a face value of a betting token or betting point, received from the an external server via the communications interface and the investor manager.

17. The computer-implemented method of claim 16, further comprising using:
a money exchange manager configured for communicating (i) through the communications interface with the digital wallet server, and (ii) with the investment manager for exchanging financial information; and
a cryptography module configured for encrypting (i) communications with the plurality of external servers and (ii) the data stored by the micro-financing platform, using at least one cryptography algorithm.

18. The computer-implemented method of claim 17, where the external servers comprise at least one of:
a bank server connected to a database holding account data, and financial data;
a credit card company server connected to a database holding credit card data, and financial data;
a prepaid card company server connected to a database holding prepaid card data, and financial data;
a cryptocurrency server connected to a database holding cryptocurrency data;
a gaming operator server connected to a database holding at least one of gaming data and instant game of chance ticket data;
an energy market operator server connected to a database holding energy producer, energy consumer, and local energy community data;

a crowdfunding operator server connected to a database holding company, company-to-be-formed, financial, and investor data;

a venture capital or investment fund server connected to a database holding company, financial and investor data;

a digital wallet server connected to a database holding money owner and financial data;

a stock exchange server connected to a database holding company and investment data;

an energy exchange server connected to a database holding energy producer, energy consumer, local energy community, electricity price, and financial data;

an analyst company server connected to a database holding company, market and financial data;

a data analyst server connected to a database holding company, market and financial data;

a tax server connected to a tax database holding tax regulatory and financial data, a legislation server connected to a legislation database 394 holding laws and regulation data;

a financial server connected to a financial database holding financial data; and a web server connected to a plurality of databases holding general data associated with web pages.

19. The computer-implemented method of claim 18, further comprising using modules inside the investment manager, comprising:

a forecasting module configured for analyzing the data and the structured information received by the investment manager and for creating forecasts;

a Present Value (PV) module configured for using structured information for calculating a PV of company shares, and a PV of company bonds, where the structured information comprises average and historical interest rates from the financial manager, and forecasts from the forecasting module; and an equivalency module configured for using data and structured information from the investment manager, for calculating equivalents between a face value and the PV, where the data and structured information comprise a PV of company shares, a PV of company bonds, and one of (i) a face value of the investment portion of the instant game of chance ticket held by a micro-investor, and (ii) a face value of the investment portion of one of (a) the betting points, and (b) the betting scores stored in the digital wallet and associated with the micro-investor.

20. The computer-implemented method of claim 19, further comprising:

commanding the investor manager to (i) request from the gaming operator server the face value of the investment portion associated with the game of chance ticket purchased the micro-investor, or (ii) request from the digital wallet server one of (a) the face value of at least one betting point and (b) the face value of at least one betting token associated with the micro investor and to convert the face value of (i) the investment portion associated with the game of chance ticket, or (ii) one of (a) the betting point and (b) the betting token associated with the micro investor, to a corresponding micro-investor interest in the investment pool of companies, where the game of chance ticket includes the gaming portion having a fixed value and the investment portion having the face value, and where the fixed value of the investment portion and the face value of the gaming portion correspond to a purchase value of the game of chance ticket; and commanding the investment manager to use legal, regulatory, tax, and financial structured information for at least one of:

calculating the present value of the micro-investment and of alternative micro-investments, and exchanging the micro-investor interest in the investment pool of companies for a different interest in the same investment pool of companies or for an interest in another investment pool of companies;

reinvesting the winnings corresponding to the gaming portion into the same investment pool of companies or into another investment pool of companies, or into a combination of both investment pools of companies; and exchanging the micro-investor interest in the investment pool of companies for a different interest in the same investment pool of companies or for an interest in another investment pool of companies by first converting the micro-investor interest in the investment pool of companies into investment points.

\* \* \* \* \*